(12) United States Patent
Morimoto et al.

(10) Patent No.: US 10,178,314 B2
(45) Date of Patent: Jan. 8, 2019

(54) MOVING OBJECT PERIPHERY IMAGE CORRECTION APPARATUS

(75) Inventors: Takuji Morimoto, Tokyo (JP); Tetsuji Haga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 775 days.

(21) Appl. No.: 13/990,944

(22) PCT Filed: Mar. 8, 2011

(86) PCT No.: PCT/JP2011/001354
§ 371 (c)(1),
(2), (4) Date: May 31, 2013

(87) PCT Pub. No.: WO2012/120561
PCT Pub. Date: Sep. 13, 2012

(65) Prior Publication Data
US 2013/0258047 A1 Oct. 3, 2013

(51) Int. Cl.
*H04N 7/00* (2011.01)
*H04N 5/232* (2006.01)
*G06T 3/00* (2006.01)
*G06T 5/00* (2006.01)
*G06T 7/13* (2017.01)

(52) U.S. Cl.
CPC ....... *H04N 5/23267* (2013.01); *G06T 3/0062* (2013.01); *G06T 5/006* (2013.01); *G06T 7/13* (2017.01); *G06T 2207/30264* (2013.01)

(58) Field of Classification Search
CPC .............................. G06T 5/006; G06T 7/0085
USPC .......................................................... 348/148
See application file for complete search history.

(56) References Cited

U.S. PATENT DOCUMENTS

| 5,691,765 | A | 11/1997 | Schieltz et al. | |
| 8,319,618 | B2 * | 11/2012 | Gomi | B60R 1/00 340/435 |
| 2004/0218401 | A1 * | 11/2004 | Okubo | B60Q 1/085 362/526 |
| 2006/0093239 | A1 * | 5/2006 | Kakinami | G06T 3/0018 382/275 |
| 2006/0271287 | A1 * | 11/2006 | Gold | G01C 21/26 701/426 |

(Continued)

FOREIGN PATENT DOCUMENTS

JP 11-510341 A 9/1999
JP 2004-86747 A 9/1999

(Continued)

OTHER PUBLICATIONS

Farid, Hany, and Alin C. Popescu. "Blind removal of lens distortion." JOSA A 18.9 (2001): 2072-2078. (Year: 2001).*

*Primary Examiner* — Tat C Chio
*Assistant Examiner* — Fabio S Lima
(74) *Attorney, Agent, or Firm* — Birch, Stewart, Kolasch & Birch, LLP

(57) ABSTRACT

A reference line detection unit 12 extracts an edge from a distorted image taken by a fisheye camera to thereby determine a curved reference line. A distortion parameter calculation unit 13 calculates a distortion parameter such that the reference line is made linear. A distortion correction unit 14 corrects distortion of the distorted image by a distortion correction equation by using the distortion parameter.

13 Claims, 17 Drawing Sheets

(56) References Cited

U.S. PATENT DOCUMENTS

| | | | | |
|---|---|---|---|---|
| 2008/0285886 A1* | 11/2008 | Allen | ................ | G06F 17/30241 |
| | | | | 382/284 |
| 2009/0110329 A1* | 4/2009 | Lin | ................ | G06T 5/006 |
| | | | | 382/293 |
| 2009/0262231 A1* | 10/2009 | Murata | ................ | G06T 5/006 |
| | | | | 348/335 |
| 2010/0039548 A1* | 2/2010 | Sakai | ................ | H04N 5/23293 |
| | | | | 348/333.12 |
| 2010/0110189 A1* | 5/2010 | Kuboyama | ................ | B60R 1/00 |
| | | | | 348/148 |
| 2010/0194907 A1* | 8/2010 | Yamaguchi | ................ | H04N 5/217 |
| | | | | 348/222.1 |
| 2011/0144907 A1* | 6/2011 | Ishikawa | ................ | G01C 21/30 |
| | | | | 701/532 |
| 2012/0105635 A1* | 5/2012 | Erhardt | ................ | B60R 25/102 |
| | | | | 348/148 |
| 2012/0158243 A1* | 6/2012 | Pupin | ................ | B62D 15/0295 |
| | | | | 701/36 |
| 2012/0183198 A1* | 7/2012 | Zahniser | ................ | G06K 9/00134 |
| | | | | 382/133 |

FOREIGN PATENT DOCUMENTS

| | | | |
|---|---|---|---|
| JP | 2004086747 A | * | 3/2004 |
| JP | 2006-127083 A | | 5/2006 |
| JP | 2007-158639 A | | 6/2007 |
| JP | 2010-178018 A | | 8/2010 |

* cited by examiner

MOVING OBJECT PERIPHERY IMAGE CORRECTION APPARATUS

TECHNICAL FIELD

The present invention relates to a moving object periphery image correction apparatus for correcting distortion of an image taking the periphery of a moving object.

BACKGROUND ART

In recent years, with the aim of securing a vehicle periphery view for a driver, a fisheye camera mounted vehicle has been increased. Since the fisheye camera can achieve a relatively wider view, it is suitable for the purpose of securing a view in a backward movement of a vehicle, for example. However, since an image taken (picked up) by the fisheye eye camera is distorted, it may be hard to see the image depending on a situation; also, when the image is used for the purpose of object detection and the like, a distortion component thereof may be a cause of a false operation, and hence it is necessary to correct the distortion.

A technique for correcting the distortion of the image taken by the fisheye camera is generally known; for example, there are Patent Documents 1 and 2. In a video surveillance system according to Patent Document 1, a distortion property of a fisheye lens to be equipped in a camera is parameterized in advance, and the distortion of the image is corrected with the use of these parameters. Also, a vehicle driving support apparatus according to Patent Document 2 calculates an amount of displacement of an taking position caused by a change of a mounting position of a camera in replacement of a camera for taking a vehicle periphery, and a parameter for distortion correction of a distorted image that is set in the camera before the replacement is just corrected for the amount of displacement of the taking position to be reset in the camera after the replacement.

PRIOR ART DOCUMENTS

Patent Documents

Patent Document 1: Japanese Unexamined Patent Application Publication No. 1999-510341
Patent Document 2: Japanese Patent Application Laid-open No. 2007-158639

SUMMARY OF THE INVENTION

Problems to be Solved by the Invention

An existing technique such as Patent Document 1 is a technique of correcting the distorted image on the premise that properties of a camera (distortion amount, focal length, and so on) are known, and thus a setting work to set firstly the properties of the camera to the system becomes necessary. Also, in the method in Patent Document 2, although it is possible to save one trouble that occurs in the camera replacement, the setting work itself such that the properties of the camera are firstly measured to be set thereto is still necessary, and hence this setting work cannot be lightened.

In consideration of a car-navigation apparatus having a camera connecting function as an example, some pieces of information such as properties of the camera and its mounting position are different according to the camera to be connected, a vehicle shape, and the like, and hence a setting work such that a user's self measures various kinds of information and sets the resultant to the car-navigation apparatus is necessary. However, in the first place, it is difficult for the user to measure the properties of the camera and so on. Besides, even when the pieces of information about the properties of the camera and so on are prepared in advance, if the setting operation is cumbersome, the user may interrupt the setting work.

As mentioned above, there is a problem such that the conventional is troublesome for the setting work of the properties of the camera and so on.

The present invention has been made to solve the aforementioned problem, and an object of the invention is to provide a moving object periphery image correction apparatus in which the setting work of the properties of the camera by the user can be eliminated or simply set with reduced operations by automatically performing the distortion correction of the image.

Means for Solving the Problem

A moving object periphery image correction apparatus of the present invention includes: an image pickup unit for acquiring a periphery image from an imaging device that takes a periphery of a moving object; a reference line detection unit for extracting an edge from the periphery image acquired by the image pickup unit to thereby determine a curved reference line from the said edge; a distortion parameter calculation unit for calculating a distortion parameter for distortion correction of the periphery image such that the reference line determined by the reference line detection unit is made linear; a distortion correction unit for correcting distortion of the periphery image acquired by the image pickup unit with the use of the distortion parameter calculated by the distortion parameter calculation unit, and outputting the resultant as a periphery image to be displayed on a display unit; and a topographical information acquiring unit for acquiring topographical information of the periphery of the moving object, wherein the image pickup unit selectively acquires the periphery image from the imaging device by using the topographical information acquired by the topographical information acquiring unit.

Effect of the Invention

According to the invention, it is possible to provide a moving object periphery image correction apparatus which eliminates a setting work of properties of a camera by a user.

BEST MODE FOR CARRYING OUT THE INVENTION

In the following, in order to explain the present invention in more detail, embodiments for carrying out the invention will be described with reference to the accompanying drawings.

Embodiment 1

Figure 1:
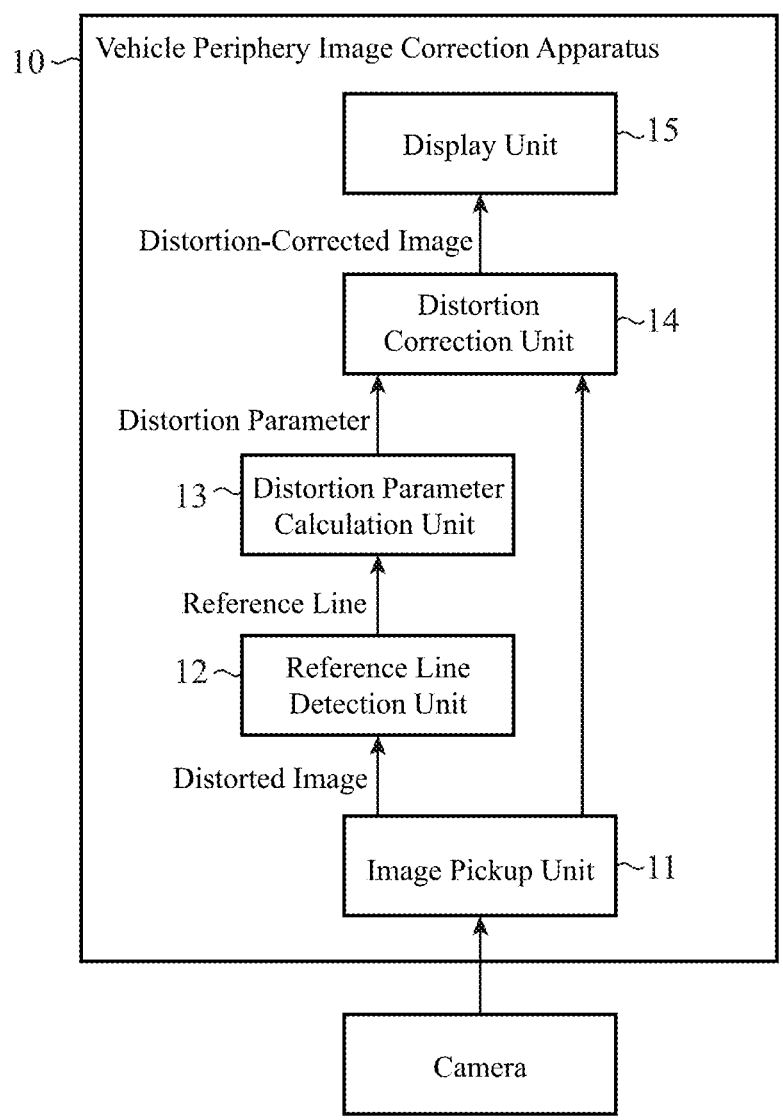
FIG. 1 is a block diagram showing a configuration of a vehicle periphery image correction apparatus according to Embodiment 1 of the present invention.

A vehicle periphery image correction apparatus 10 shown in FIG. 1 is composed of: an image pickup unit 11 connected to an imaging device (hereinafter, referred to as "camera"); a reference line detection unit 12 for performing predetermined processing; a distortion parameter calculation unit 13 and a distortion correction unit 14; and a display unit 15 connected to a display device. Here, assuming a case where the vehicle periphery image correction apparatus 10 is used with built in a car-navigation apparatus and so on to be installed in a vehicle, a camera mounted on the vehicle and a display device installed in the interior of the vehicle are utilized.

The image pickup unit 11 is an interface for image inputting, and acquires a taken image of a vehicle periphery with connected to a wide-angle imaging device such as a fisheye camera that is mounted on the vehicle, and outputs the resultant to the reference line detection unit 12 and the display unit 15. Since an extreme distortion (deformation) is produced in the taken (picked up) image by the wide-angle imaging device, it is corrected by the vehicle periphery image correction apparatus 10. However, although it is not limited to the wide-angle imaging device, the distortion in the image is produced even by a normal camera due to deformation of the lens and the like, and hence it may be a subject to be corrected by the vehicle periphery image correction apparatus 10.

Hereinafter, a description will be given by using a wide-angle rear camera as the camera to be connected to the image pickup unit 11 by way of example.

Using a distorted image acquired by the image pickup unit 11 as an input, the reference line detection unit 12 detects a reference line and outputs the resultant to the distortion parameter calculation unit 13. The reference line is a horizontally-extending straight line in an actual scene, for example, an on-road white paint, a road-to-wall boundary line, the horizon, and a bumper edge of the host vehicle, whereas it is a horizontally-extending curved line due to distortion in a distorted image. The distortion parameter calculation unit 13 and the distortion correction unit 14 described later are adapted to correct the distortion of the distorted image so that the reference line is screen-displayed by a straight line.

Figure 2:
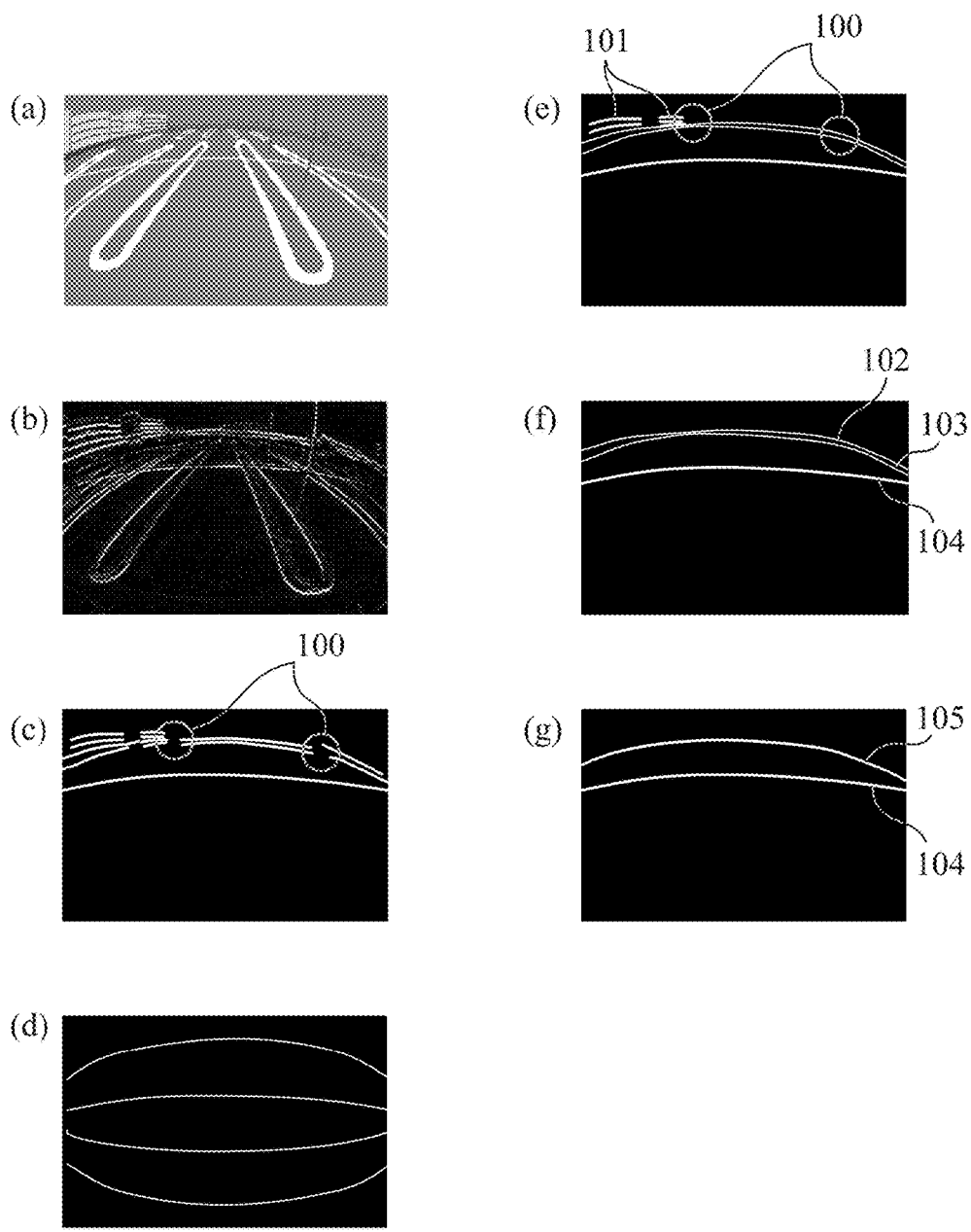
FIG. 2 is a diagram illustrating an example of a method of detecting a reference line by a reference line detection unit of Embodiment 1.

Here, an example of a method of detecting the reference line by the reference line detection unit 12 will be described by reference to FIG. 2.

In FIG. 2(a), an example of the distorted image acquired from the camera by the image pickup unit 11 is shown. The reference line detection unit 12 extracts an edge from the distorted image by image processing. FIG. 2(b) shows an edge extraction result; as shown in this figure, when a large number of edges irrelevant to the reference line exist in the image, the reference line detection unit 12 may apply the image processing such as resizing and feathering to the image to thus provide the reference line to be easily detected.

Then, the reference line detection unit 12 extracts a horizontally continued edge from the edge extraction result. An extraction result of the horizontally continued edge is shown in FIG. 2(c). When the camera is installed at the rear-side or front-side of the vehicle, it is quite rare that a vertical edge continuing from the upper end of the image to the lower end is detected, and hence vertical continuousness is ignored. However, the vertically continued edge may be extracted depending on a specific situation, for instance, in a case where the camera is installed on the lateral-side of the vehicle. It is noted that when the extracted number of the horizontally continued edges is a given number or less, the reference line detection unit 12 may abandon the distorted image so as not to be used for the following proceeding.

Then, referring to a previously-given average distortion of a fisheye camera (one example shown in FIG. 2(d)), the reference line detection unit 12 supplements a short cut between the edges in the edge extraction result of the horizontally continued edge. A result of the inter-edge supplement is shown in FIG. 2(e). Short cuts 100 shown in FIG. 2(c) are supplemented in FIG. 2(e).

Then, the reference line detection unit 12 deletes the edge not having a fixed length or more in the result of the inter-edge supplement. A deletion result of the short edge is shown in FIG. 2(f). Short edges 101 in FIG. 2(e) are deleted in FIG. 2(f), and only three edges 102 to 104 are leaved.

Then, the reference line detection unit 12 combines (unifies) the closely-located edges existing within a predetermined distance into one edge. A result of combining the closely-located edges is shown in FIG. 2(g). Closely-located edges 102 and 103 shown in FIG. 2(f) are combined into one edge 105 in FIG. 2(g).

The edges 104 and 105 finally obtained by the above method of detecting the reference line each are the reference line. It is noted that when two or more of the reference lines are detected, the reference line detection unit 12 gives a priority to each reference line thereof, and determines as a final output the reference line indicating the highest priority.

The priority can be calculated by a method such that weights are assigned to parameters P1 to P4 shown below to be summed up:

(P1) Length of the edge:
To assign a weight so that the priority is made higher as the edge is longer;

(P2) Degree of similarity between edge distortion and average distortion of fisheye cameras:
To assign a weight so that the priority is made higher as the degree of similarity is higher;

(P3) The number of edges establishing a base combined into one edge by transitional proceeding from FIG. 2(f) to FIG. 2(g):
To assign a weight so that the priority is made higher as the number of edges combined into one edge is larger; and (P4) Vertical distance from the center of the image:
To assign a weight so that the priority is made higher as the distance from the center is larger (since the distortion is smaller at the center of the image, it is unsuitable for the reference line).

The distortion parameter calculation unit 13 calculates a distortion parameter related to a distortion correction equation for coordinate transformation such that a distorted form of the reference line is made a straight form, and outputs the resultant to the distortion correction unit 14.

Using the distortion parameter calculated by the distortion parameter calculation unit 13, the distortion correction unit 14 transforms coordinates of pixels in the distorted image so that the reference line is made straight, and corrects the overall distortion of the distorted image.

As a distortion correction method, a publicly known method may be used, not particularly specified. Here, a description will be given citing as an example a barrel distortion correction which is widely used as a model of distortion correction.

Figure 3:
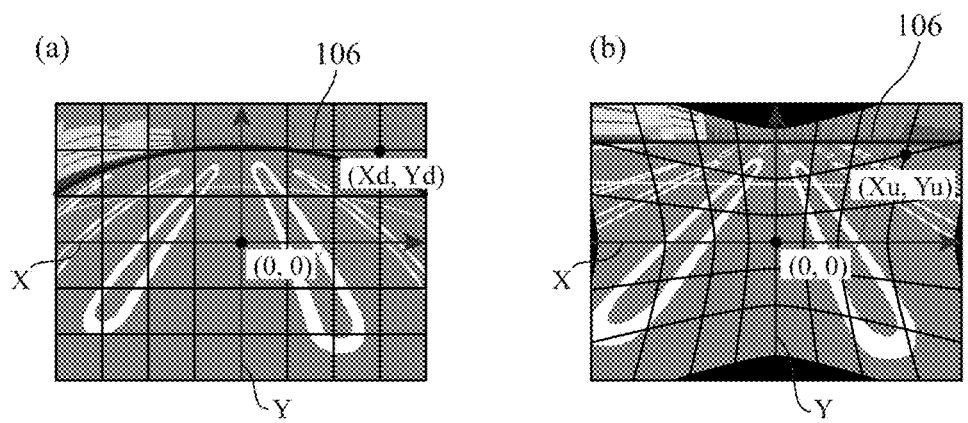
FIG. 3 is a diagram illustrating an example of a method of correcting barrel distortion by a distortion correction unit of Embodiment 1.

FIG. 3 is a diagram illustrating a method of correcting barrel distortion. FIG. 3(a) is an example of the distorted image acquired by the image pickup unit 11, and FIG. 3(b) is an example of a distortion-corrected image in which the distorted image is distortion-corrected. Here, a grid represents a coordinate position in X and Y axes set on the image with a center coordinate defined as (0, 0). Further, a reference line 106 is shown by way of example.

Then, a distortion correction equation for the barrel distortion correction includes the following equations (1):

$$Xu = Xd + k^*(Xd^2 + Yd^2)$$

$$Yu = Yd + k^*(Xd^2 + Yd^2) \quad (1)$$

where (Xu, Yu) is a coordinate after a distortion correction, (Xd, Yd) is a coordinate before the distortion correction, and k is a distortion parameter.

As is seen from the above equations (1), a distortion parameter necessary for the barrel distortion correction is k. The distortion parameter calculation unit 13 calculates the shape of the reference line 106 after the distortion correction by increasing or decreasing k in the equations (1), and outputs as the distortion parameter k in which the reference line 106 becomes closest to a straight shape.

Thereafter, using the distortion parameter k calculated by the distortion parameter calculation unit 13, the distortion correction unit 14 produces from the equations (1) the distortion-corrected image in which the coordinate (Xd, Yd) of each pixel in the distorted image acquired by the image pickup unit 11 is converted into the coordinate (Xu, Yu).

The display unit 15 displays the distortion-corrected image on the screen of the display device in a car-navigation system and so on. Also, the display unit 15 may output the distortion-corrected image to the external, and the external output allows the distortion-corrected image to be usable in another system different from a visual purpose.

Figure 4:
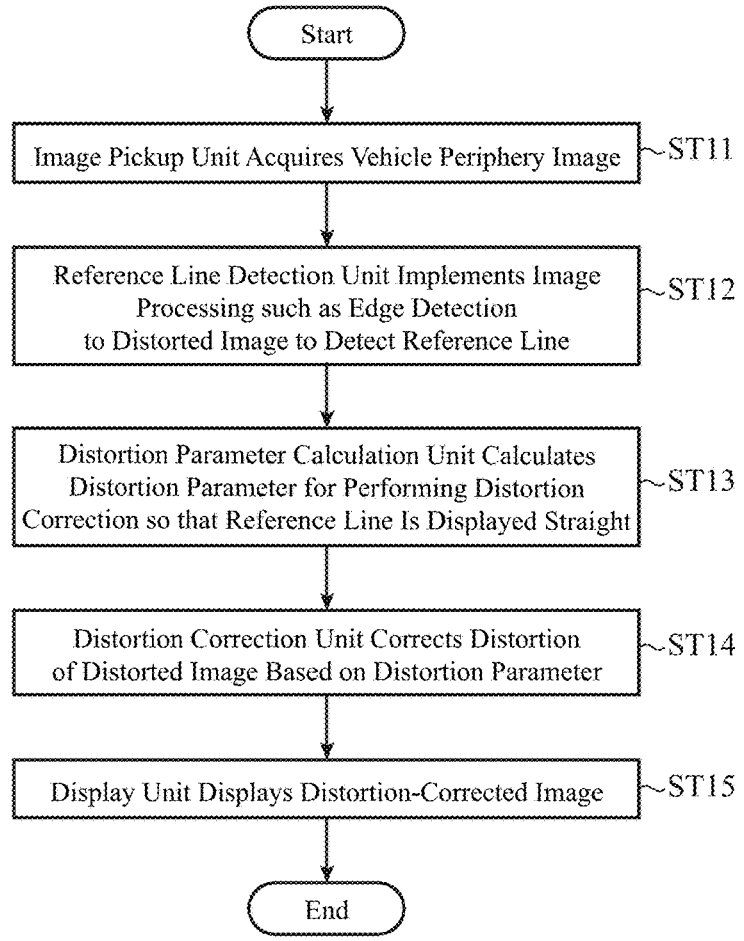
FIG. 4 is a flowchart showing an operation of the vehicle periphery image correction apparatus according to Embodiment 1.

Next, an operation of the vehicle periphery image correction apparatus 10 according to Embodiment 1 will be described by reference to a flowchart shown in FIG. 4. It is noted that a timing of starting the operation may be any timing, for example, the time when the camera is connected to the image pickup unit 11, or the time when the lightness of the distorted image taken by the camera becomes a reference value or more.

The image pickup unit 11 acquires the distorted image from the camera, and outputs the resultant to the reference line detection unit 12 and the distortion correction unit 14 (Step ST11), and the reference line detection unit 12 detects the reference line from the distorted image, and outputs the resultant to the distortion parameter calculation unit 13 (Step ST12). The distortion parameter calculation unit 13 calculates the distortion parameter based on the reference line, and outputs the resultant to the distortion correction unit 14 (Step ST13). When the distortion parameter is inputted from the distortion parameter calculation unit 13, the distortion correction unit 14 serially distortion-correct the distorted images input from the image pickup unit 11 with the use of the distortion parameter, and outputs the resultant as a distortion-corrected image to the display unit 15 (Step ST14), and the display unit 15 displays the image on the screen (Step ST15).

As described above, the vehicle periphery image correction device 10 according to Embodiment 1 is configured to include: the image pickup unit 11 for acquiring the distorted periphery image from the camera that takes the vehicle periphery; the reference line detection unit 12 for extracting the edge from the periphery image acquired by the image pickup unit 11, and determining the horizontally-extending curved reference line from the said edge; the distortion parameter calculation unit 13 for calculating the distortion parameter for distortion correction of the periphery image such that the reference line determined by the reference line detection unit 12 is made linear; the distortion correction unit 14 for correcting the distortion of the periphery image acquired by the image pickup unit 11 with the use of the distortion parameter calculated by the distortion parameter calculation unit 13; and the display unit 15 for displaying the distortion-corrected periphery image by the distortion correction unit 14. For this reason, the distortion of the periphery image can be automatically distortion-corrected without the input of the data of the properties of the camera. Thus, the vehicle periphery image correction apparatus that eliminates the setting work of the properties of the camera by a user to be not troublesome can be provided.

Embodiment 2

Figure 5:
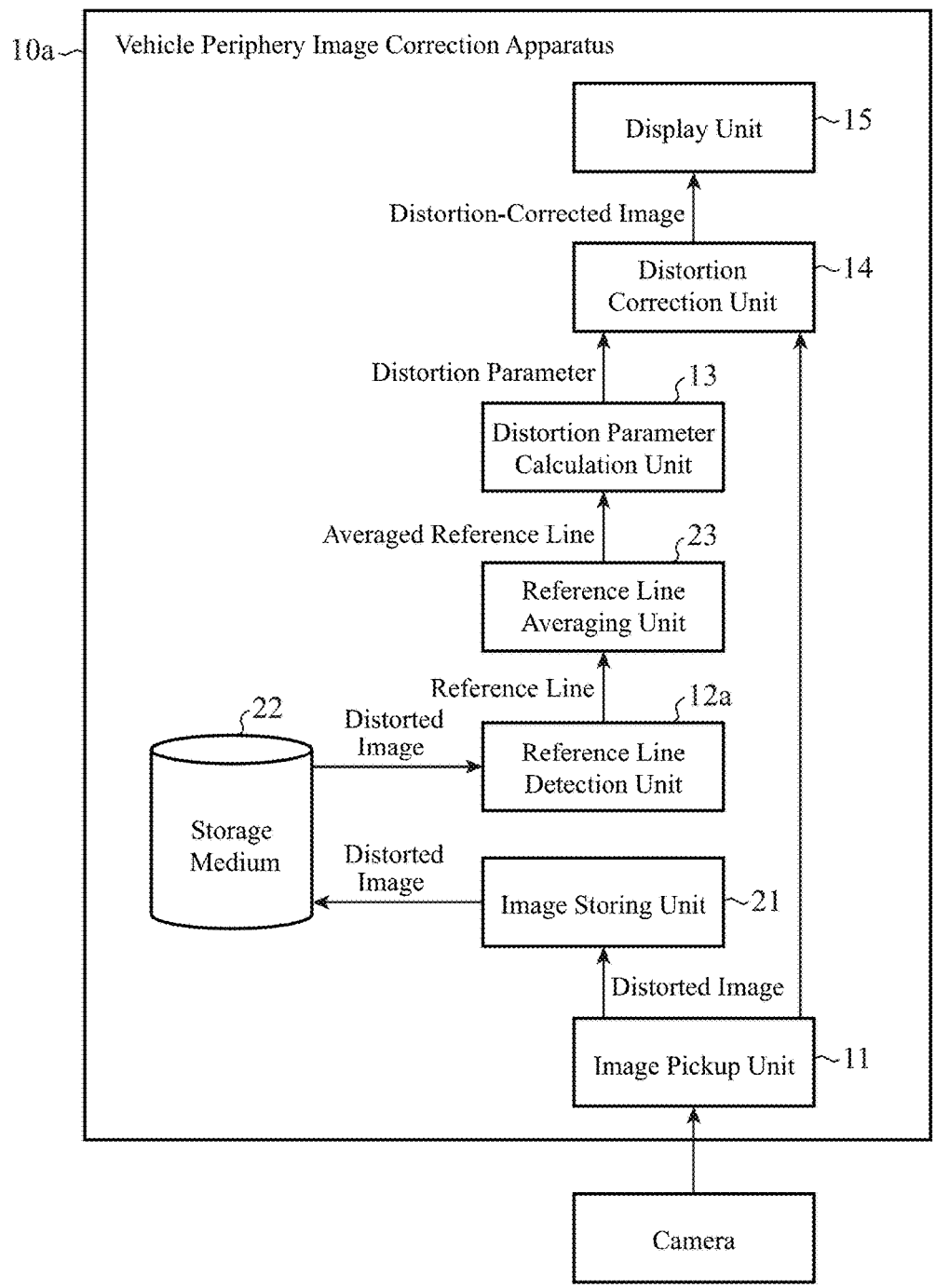
FIG. 5 is a block diagram showing a configuration of a vehicle periphery image correction apparatus according to Embodiment 2 of the invention.

FIG. 5 is a block diagram showing a configuration of a vehicle periphery image correction apparatus 10a according to Embodiment 2 of the invention. In FIG. 5, the same reference numerals are given for the same or equivalent parts as those in FIG. 1, and descriptions thereof will be omitted. The vehicle periphery image correction apparatus 10a is configured to further include an image storing unit 21, a storage medium 22, and a reference line averaging unit 23.

The image storing unit 21 stores in the storage medium 22 a plurality of distorted images acquired by the image pickup device 11. An amount of images to be stored, storing frequency, storing timing, and the like may be freely set in the image storing unit 21 depending on conditions such as the configuration of the vehicle periphery image correction apparatus 10a, accuracy required for the distortion correction, load of processing, and the like. Further, the image storing unit 21 may be configured to store the image depending on a situation of the vehicle, such that receiving information from a car-navigation apparatus, for instance, the image storing unit stores the image only while the vehicle is traveling on a linear road (for example, an expressway). Also, the image storing unit 21 may store the distorted image only when its lightness is a predetermined value or more.

A reference line detection unit 12a performs processing of reference line detection for all the images stored in the storage medium 22, and outputs the detected reference line to the reference line averaging unit 23. The reference lines detected by the reference line detection unit 12a may be one or more since the reference lines are averaged by the reference line averaging unit 23 at a later stage. When the plurality of reference lines are output as a detection result, the plurality of reference lines may be output in descending order of priorities given to the reference lines, or all the detected reference lines may be output without making a choice according to the priorities.

It is noted that in consideration of the processing time and so on, the reference line detection unit 12a may be configured to extract some images among those stored in the storage medium 22 to be subjected to the above processing. Further, when the reference line detection unit 12a is adapted to prevent the output of the image of the reference line unsuitable for the averaging to the reference line averaging unit 23, the processing time can be shortened and also a more adequate reference line can be achieved, which is more desirable. The image of the reference line unsuitable for the averaging includes the following, for example: a form of the reference line expected as a candidate to be output to the reference line averaging unit 23 is displaced significantly from an average distortion amount of fisheye cameras by a predetermined amount or more; a length of the reference line is short of a predetermined length; and the reference line is positioned at the center of the screen (a less distortion amount around the center of the screen is unsuitable for the reference line).

The reference line averaging unit 23 averages the plurality of reference lines output by the reference line detection unit 12a and determines a single reference line, and outputs the resultant to the distortion parameter calculation unit 13. When the detection of the reference line is carried out from a single distorted image, a correct reference line is not detected in some cases depending on an image picked up situation. Thus, the reference lines are detected from a plurality of distorted images and averaged to thereby enhance the reliability of the reference lines.

It is noted that when the plurality of averaged reference lines exist, the reference line averaging unit 23 selects the reference line of the highest priority or the reference line designated by a user.

Figure 6:
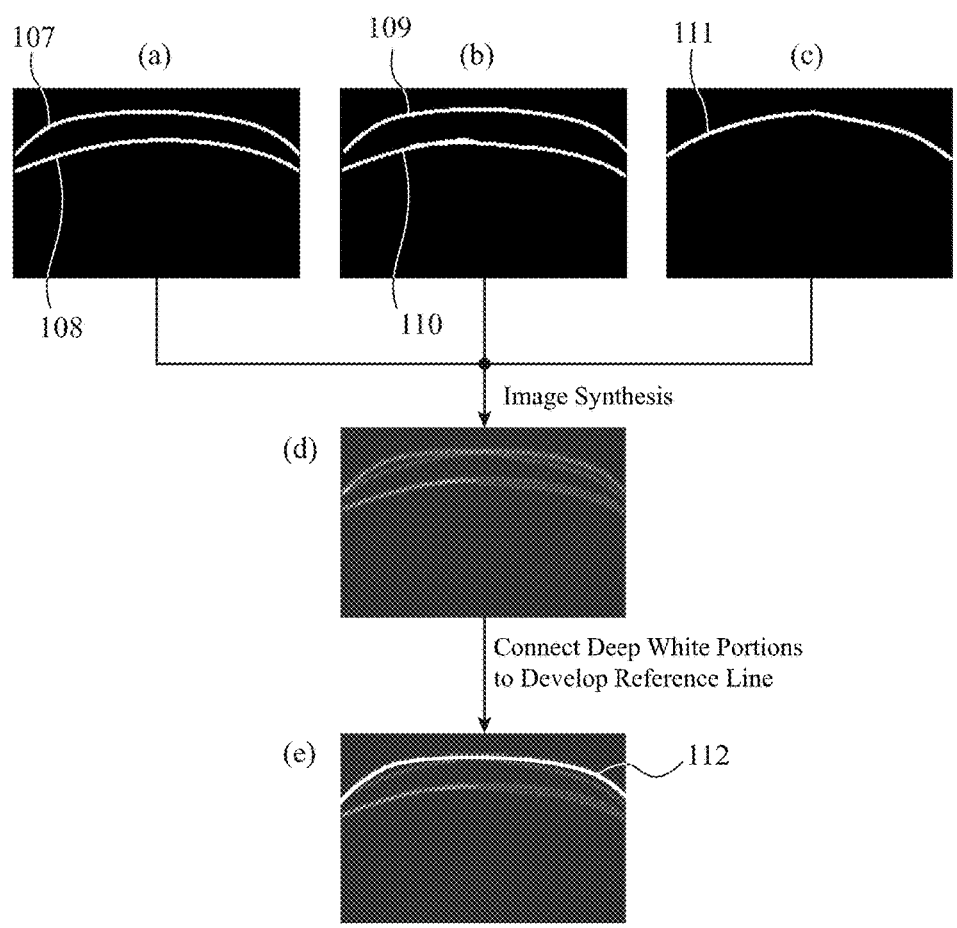
FIG. 6 is a diagram illustrating an example of a method of averaging reference lines by a reference line averaging unit of Embodiment 2.

As an averaging method, a publicly known method may be used, not particularly specified. Here, an example of the averaging will be described by reference to FIG. 6.

It is assumed that the reference line detection unit 12 detects reference lines 107 to 111 as shown in FIG. 6(a)-(c) from three distorted images. The reference line averaging unit 23 synthesizes pictures in which these reference lines 107 to 111 are drawn in white. Specifically, assuming that the respective images are monochrome pictures in which each pixel has a pixel value of "0" for white or "1" for black, an average value of the pixel values at the same pixel in the plural images is obtained to be defined as each pixel value for the synthesized image. In the pixel values of the synthesized picture, the deepest white portions (or portions where pixel values are a predetermined value or less) are considered to be equivalent to an edge; thus, when the reference line is detected in such a manner that a broken portion thereof is supplemented, the plurality of reference lines can be averaged. For example, from the synthesized picture shown in FIG. 6(d), a reference line 112 in FIG. 6(e) is selected.

It is noted that the reference line averaging unit 23 may determine a weighted average by adjusting the depth of the white according to the priorities assigned to the plurality of reference lines.

Figure 7:
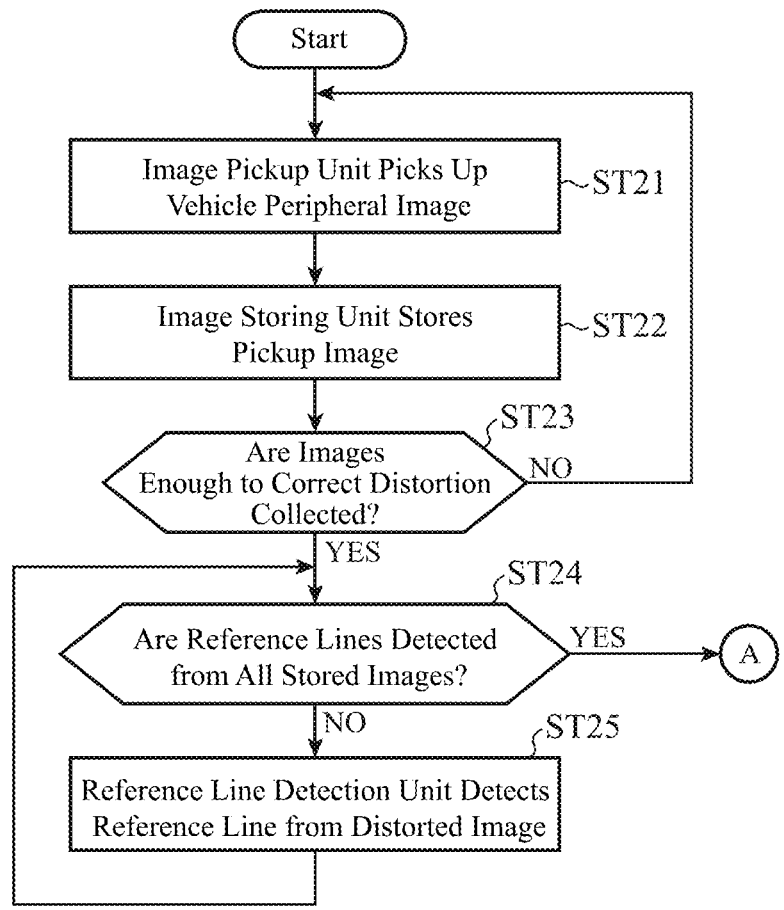
FIG. 7 is a flowchart showing an operation of the vehicle periphery image correction apparatus according to Embodiment 2.
Figure 8:
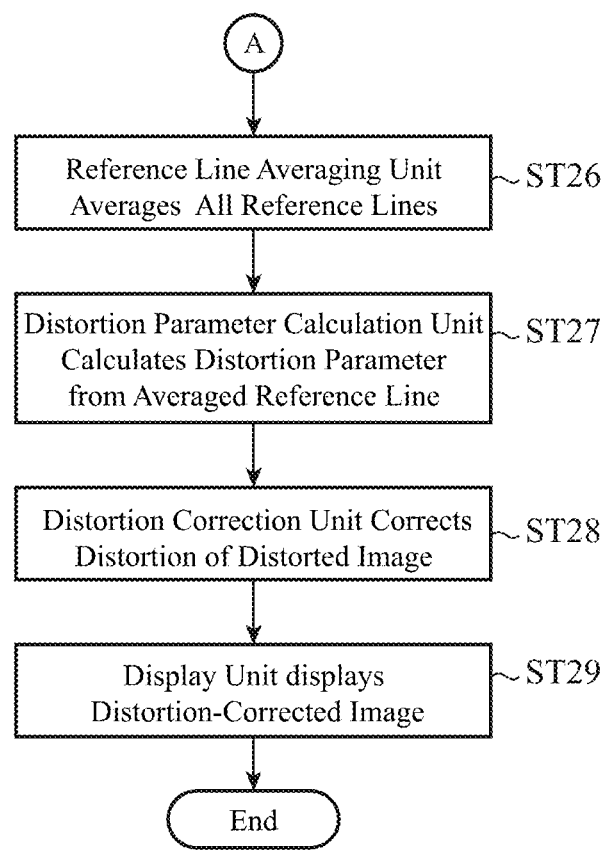
FIG. 8 is a flowchart showing the operation of the vehicle periphery image correction apparatus according to Embodiment 2, following FIG. 7.

Next, an operation of the vehicle periphery image correction apparatus 10a according to Embodiment 2 will be described by reference to flowcharts shown in FIG. 7 and FIG. 8.

The image pickup unit 11 acquires the distorted image from the camera, and outputs the resultant to the image storing unit 21 and the distortion correction unit 14 (Step ST21), and the image storing unit 21 stores the distorted image in the storage medium 22 (Step ST22). The image storing unit 21 determines whether or not the distorted images sufficient and enough for distortion correction processing has been stored therein (Step ST23); if it is not enough (Step ST23 "NO"), the flow returns to Step ST21. If it is enough (Step ST23 "YES"), then the reference line detection unit 12a determines whether or not the detections of the reference line are completed from all the distorted images stored in the storage medium 22 (Step ST24). If the detections are not completed from all the images (Step ST24 "NO"), the reference line detection unit 12a detects the reference line for each unit of the plurality of distortion images (Step ST25).

When the reference line detection unit 12a finished detecting the reference lines from all the distorted images stored in the storage medium 22 (Step ST24 "YES"), these reference lines are outputted to the reference line averaging unit 23. The reference line averaging unit 23 calculates a single reference line by averaging all of these reference lines, and output the resultant to the distortion parameter calculation unit 13 (Step ST26). The distortion parameter calculation unit 13 calculates a distortion parameter based on the averaged single reference line and outputs the resultant to the distortion correction unit 14 (Step ST27). When the distortion parameter is inputted from the distortion parameter calculation unit 13, the distortion correction unit 14 serially distortion-corrects the distorted images input from the image pickup unit 11 with the use of the distortion parameter, and outputs the resultant as a distortion-corrected image to the display unit 15 (Step ST28), and the display unit 15 displays the image on the screen (Step ST29).

As described above, the vehicle periphery image correction apparatus 10a according to Embodiment 2 is configured to further include: the image storing unit 21 for storing the distorted image acquired by the image pickup unit 11 in the storage medium 22; and the reference line averaging unit 23 for averaging the plurality of reference lines, wherein the reference line detection unit 12a calculates the reference lines from the plurality of periphery images stored in the storage medium 22, and outputs the resultant to the reference line averaging unit 23, and wherein the distortion parameter calculation unit 13 calculates the distortion parameter such that the averaged reference line by the reference line averaging unit 23 is made linear. For this reason, a noise component thereof can be removed by the averaging of the reference lines to thereby obtain the reference line with high reliability.

Incidentally, in the vehicle periphery image correction unit 10a according to Embodiment 2 described above, it is configured that after the reference line averaging unit 23 averages the plurality of reference lines, the distortion parameter calculation unit 13 calculates the distortion parameter from the averaged reference line; however, it is not limited to this, and may be configured in reverse order of the processing to firstly calculate the distortion parameters related to each of the plurality of reference lines, and to then average the plurality of distortion parameters.

Figure 9:
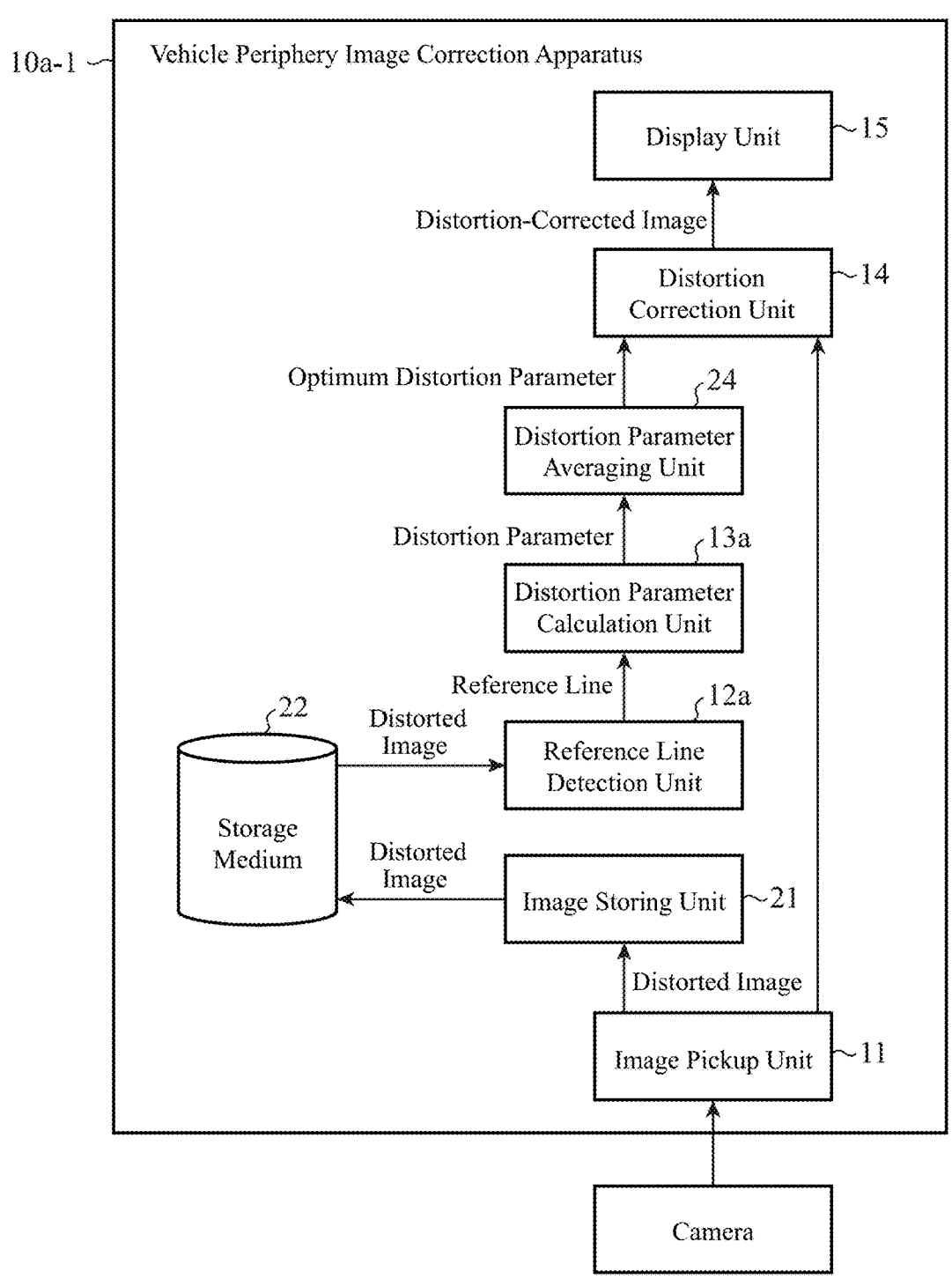
FIG. 9 is a block diagram showing a configuration of a modification of the vehicle periphery image correction apparatus according to Embodiment 2.

A modification is shown in FIG. 9. In FIG. 9, the same reference numerals are given for the same or equivalent parts as in FIG. 1 and FIG. 5, and description thereof will be omitted. Such a vehicle periphery image correction apparatus 10a-1 is configured to include a distortion parameter averaging unit 24 which is an optimum distortion parameter calculation unit for calculating an optimum distortion parameter from a plurality of distortion parameters.

A distortion parameter calculation unit 13a calculates a distortion parameter for each of reference lines in one or more distorted images input from a reference line detection unit 12a, and output the resultant to the distortion parameter averaging unit 24.

Receiving the distortion parameters calculated by the distortion parameter calculation unit 13a from the reference lines in the one or more distorted images, the distortion parameter averaging unit 24 calculates an averaged distortion parameter, and output the resultant to the distortion correction unit 14.

Similarly to that of Embodiment 2 described above, the distortion correction unit 14 serially distortion-corrects the distorted images to be input from an image pickup unit 11 with the use of the distortion parameter, and the display unit 15 displays the resultant on the screen as a distortion-corrected image.

The averaging processing of the distortion parameters by the distortion parameter averaging unit 24 may be any kind of method, not particularly specified. The distortion parameters required for the distortion correction may be simply averaged, or an average value may be calculated taking account of each distortion correction model. Further, the distortion parameter averaging unit 24 may perform the averaging with excepting inappropriate distortion parameters from among the distortion parameters that are input from the distortion parameter calculation unit 13a. Furthermore, the optimum distortion parameter may be calculated from the plurality of distortion parameters by a method other than the averaging processing.

As mentioned above, the vehicle periphery image correction unit 10a-1 is configured to further include: the distortion parameter averaging unit 24 for calculating the optimum distortion parameter with the use of the plurality of distortion parameters calculated by the distortion parameter calculation unit 13a, wherein the distortion parameter averaging unit 24 calculates the average of the plurality of distortion parameters to determine the optimum distortion parameter, and the distortion correction unit 14 corrects the distortion of the periphery image with the use of the optimum distortion parameter calculated by the distortion parameter averaging unit 24. For this reason, the averaged distortion parameter is determined with the numerous reference lines detected from the plurality of distorted images, and hence accuracy of the distortion correction can be enhanced.

Embodiment 3

Figure 10:
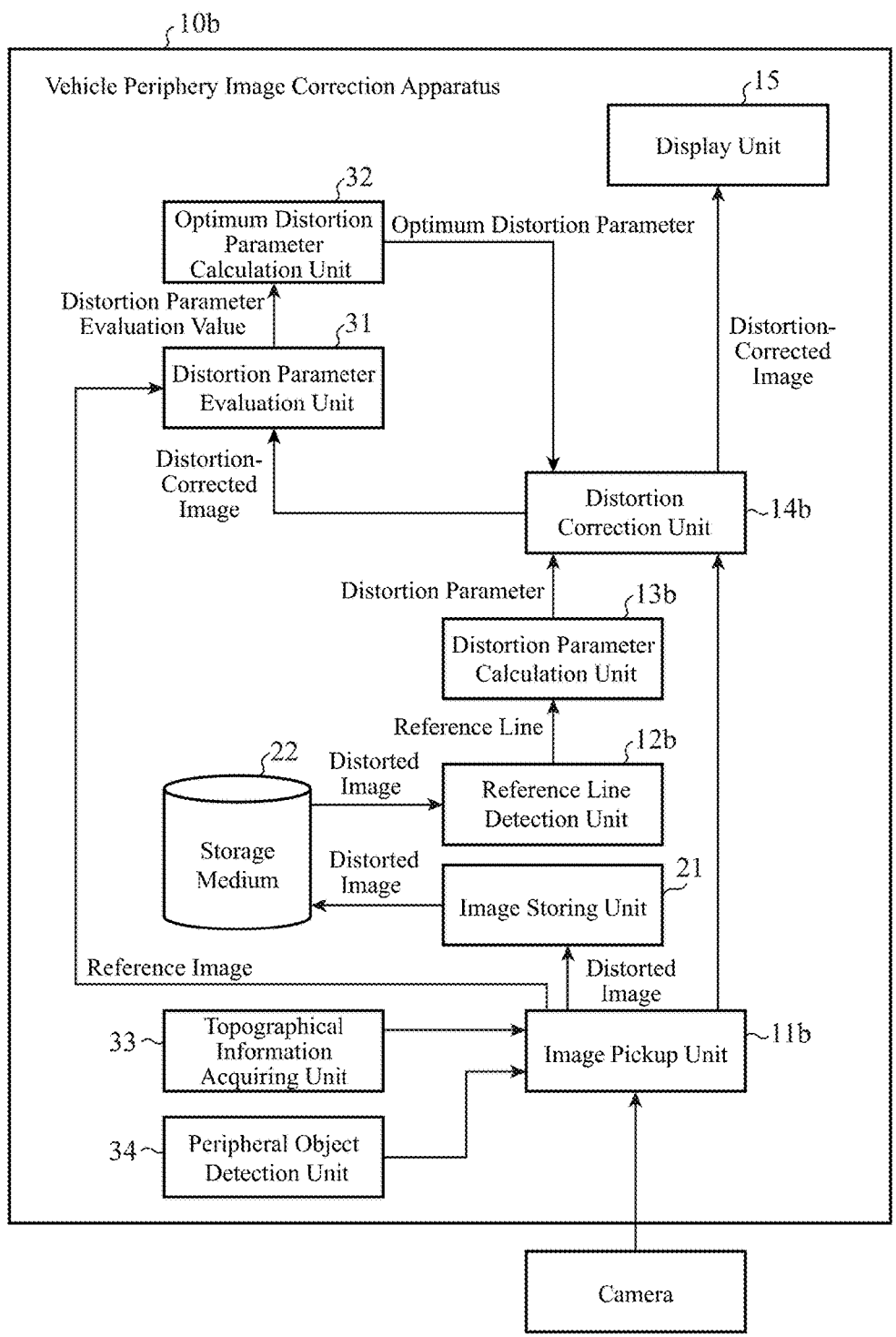
FIG. 10 is a block diagram showing a configuration of a vehicle periphery image correction apparatus according to Embodiment 3 of the invention.

FIG. 10 is a block diagram showing a configuration of a vehicle periphery image correction apparatus 10b according to Embodiment 3 of the invention. In FIG. 10, the same reference numerals are given for the same or equivalent parts as those in FIG. 1 and FIG. 5, and descriptions thereof will be omitted. Such a vehicle periphery image correction apparatus 10b is configured to further include a distortion parameter evaluation unit 31, an optimum distortion parameter calculation unit 32, a topographical information acquiring unit 33 and a peripheral object detection unit 34.

For a plurality of distortion parameters that are calculated from each of a plurality of distorted images input from a distortion correction unit 14b, the distortion parameter evaluation unit 31 calculates an evaluation value indicating how properly a distortion-corrected image which is distortion-corrected with the use of the corresponding distortion parameter is distortion-corrected, and outputs the resultant to the optimum distortion parameter calculation unit 32.

Figure 11:
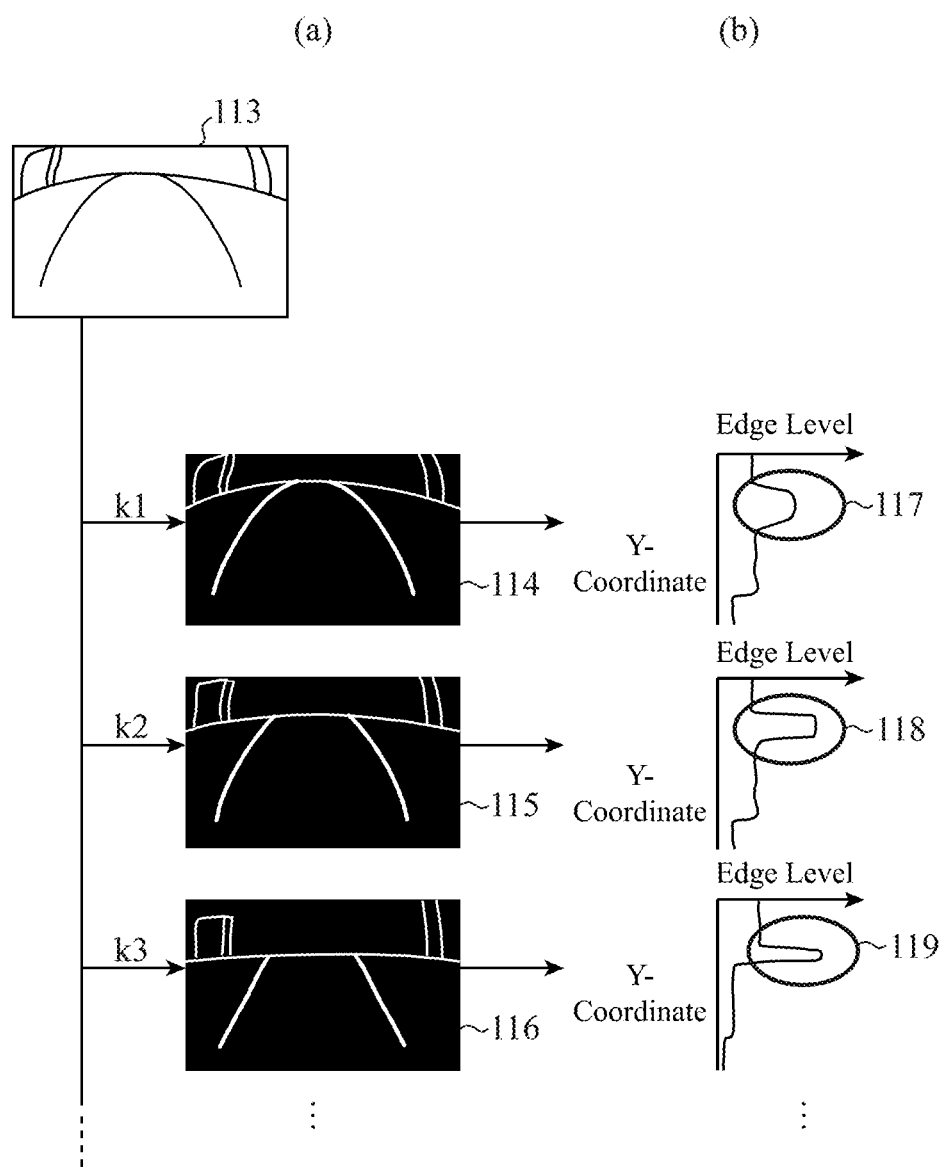
FIG. 11 is a diagram illustrating an example of a method of calculating an evaluation value by a distortion parameter evaluation unit of Embodiment 3.

A calculation method of the evaluation value may be any kind of method, not particularly specified. Here, an example of the calculation method is described by reference to FIG. 11.

Preparing a distorted image as a reference image for an evaluation, the distortion parameter evaluation unit 31 executes distortion correction of the reference image with the use of each distortion parameter thereof, and performs edge extraction from the distortion-corrected reference image. In FIG. 11(a), there are shown a reference image 113, and edge-extracted images 114 to 116 in which the reference image 113 is distortion-corrected with distortion parameters k1 to k3 and edge-extracted.

It is noted that as the reference image, the distortion parameter evaluation unit 31 may use the distorted image stored in the storage medium 22, or may use the distorted image newly acquired by the image pickup unit 11b. Further, the distortion parameter evaluation unit 31 not only simply performs the edge extraction, but also may delete a vertically continuing edge or supplement a cut between the edges in the distortion-corrected reference image, similarly to the reference line detection unit 12b.

For example, in a case where an image having a higher priority (suitability) for a reference is extracted out of picked up camera images to be used as the reference image, the priority can be determined by, for example, acquiring each score with respect to the following items (A) to (C), and summing up these scores.

(A) Image Different from the Distorted Image in which the distortion parameter is calculated:

The distortion parameter evaluation unit 31 lowers the score of the distorted image to be used for a distortion parameter calculation in the distortion parameter calculation unit 13b so that the distorted image is hard to be selected or is brought to be completely unselected as the reference image. It is noted that when the distorted image for calculating the distortion parameter is used as the reference image, the distortion parameter calculated from the reference image becomes an optimum distortion parameter, which poses a problem such that the optimum distortion parameter cannot be determined in the optimum distortion parameter calculation unit 32 described later any longer.

(B) the Number or Priority of Reference Lines Detected by Reference Line Detection Processing:

Since a reference line with a higher priority given by the reference line detection unit 12b has a feature: having a clear edge, and so on, it is also effective as the reference image. Thus, the distortion parameter evaluation unit 31 raises the score as this priority is higher.

Further, the distorted image such that too many reference lines are detected provides a large number of prominent portions in an edge-level graph as shown in FIG. 11(b) described later, which may interfere with a proper evaluation thereof; thus, the score thereof is lowered or it is brought to be completely unselected as the number of the reference lines is larger.

(C) Picked Up Place of the Image:

At an open place having no structures around the vehicle or on an expressway, a probability to acquire a proper reference image is higher. Thus, the vehicle periphery image correction apparatus 10b is provided with the topographical information acquiring unit 33 for acquiring the topographical information in the vehicle periphery, and by utilizing the topographical information acquired by the topographical information acquiring unit 33, the image pickup unit 11b outputs an image and gives a higher score to an image if that image is picked up at a place suitable for the image-acquiring of the reference image (for example, an expressway), or outputs only an image that is picked up at the suitable place.

Also, the vehicle periphery image correction apparatus 10b is provided with the peripheral object detection unit 34 for detecting an object existing in the vehicle periphery, and by utilizing the information related to the object detected by the peripheral object detection unit 34, the image pickup unit 11b outputs an image with giving a higher score to an image that is taken at a place suitable for acquisition of the reference image (for example, a place where no object is detected), or outputs only the image that is picked up at the suitable place.

It is noted that in a case of using the reference image based on the item (C), the apparatus may be provided by a configuration having either or both of the topographical information acquiring unit 33 and the peripheral object detection unit 34; when the item (C) is not taken into consideration, they are unnecessary. The topographical information acquiring unit 33 is a means for extracting the topographical information from, for example, map information of a car-navigation apparatus, and the peripheral object detection unit 34 is a means for detecting the object by, for example, including an ultrasonic sensor installed in a vehicle body thereof or an image processing device for recognizing the object from the camera image.

Also, the distortion parameter evaluation unit 31 uses the plurality of images having a higher score determined based on the above items (A) to (C) as the reference images, and hence a more optimum distortion parameter can be determined in the optimum distortion parameter calculation unit 32 described later.

Subsequently, the distortion parameter evaluation unit 31 prepares for each edge-extracted image a graph that indicates the Y-coordinate of the image in the vertical axis and the edge-level (amount of edge) at each Y-coordinate in the horizontal axis. Here, in the edge-extracted images 114 to 116 in FIG. 11(a), pixels corresponding to an extracted edge are indicated in white color, and the number of the white pixels in the same horizontal line are calculated as the edge-level to prepare the graph shown in FIG. 11(b). Thus, at a portion in the image where the horizon, a vehicle bumper, and so on exist, the edge-level becomes prominent. In particular, when the distorted reference image has been adequately corrected, the prominent portion in the graph becomes steep, and hence the degree of its steepness (width and height) is defined as an evaluation value indicative of the adequacy of the distortion correction.

When the prominent portions 117 to 119 in the three graphs in FIG. 11(b) are compared with one another, the prominent portion 119 is narrowest in width and also highest in height, so that the evaluation value of the distortion parameter k3 becomes highest. In contrast, the prominent portion 117 is widest in width and lowest in height, so that the evaluation value of the distortion parameter k1 becomes lowest.

Incidentally, in consideration of a possibility such that the camera is not properly mounted on the vehicle to be inclined, the distortion parameter evaluation unit 31 may prepare an image in which the produced edge-extracted image is rotated to right and left by a given angle, and may create and evaluate a graph indicating the edge-level from the rotated image.

The optimum distortion parameter calculation unit 32 calculates an optimum distortion parameter based on the evaluation value of each of the distortion parameters calculated by the distortion parameter evaluation unit 31, and outputs the resultant to the distortion correction unit 14b. As a simple calculation method, a method that adopts a distortion parameter with the highest evaluation value as the optimum distortion parameter without change is specified. Further, in order to make the accuracy higher, the optimum distortion parameter may be provided as follows: proceeding similar to that in the reference line averaging unit 23 in Embodiment 2 describe above is implemented to a set (aggregation) of the reference lines establishing a base for calculating the distortion parameter in which the evaluation value is a fixed value or more to thus calculate an averaged reference line, and the distortion parameter is calculated from that reference line.

The distortion correction unit 14b outputs a set of the distortion-corrected image and the distortion parameter used in producing the distortion-corrected image to the distortion parameter evaluation unit 31. Further, the distortion correction unit distortion-corrects the distorted image input from the image pickup unit 11b with the use of the optimum distortion parameter input from the distortion parameter evaluation unit 31, and outputs the resultant to the display unit 15.

Next, an operation of the vehicle periphery image correction apparatus 10b according to Embodiment 3 will be described by reference to a flowchart shown in FIG. 12. Here, the processing prior to Step ST31 are the same as the flowchart shown in FIG. 7 of Embodiment 2 described above, and descriptions thereof will be omitted.

Figure 12:
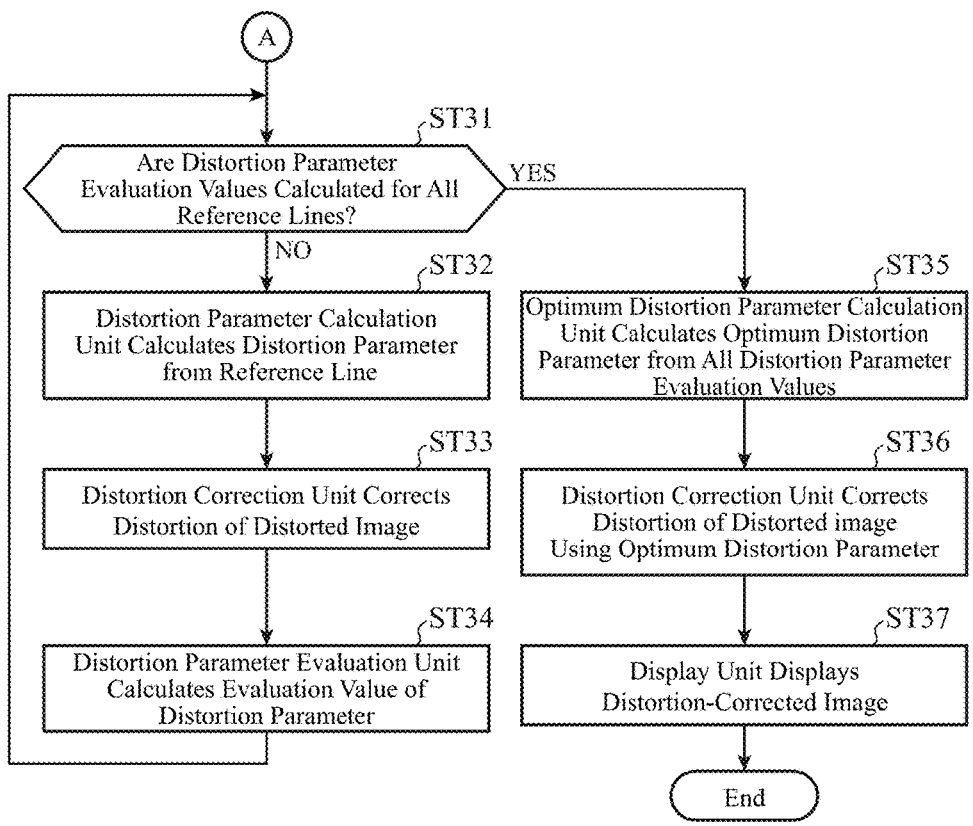
FIG. 12 is a flowchart showing an operation of the vehicle periphery image correction apparatus according to Embodiment 3.

When the reference line detection unit 12b finishes detecting the reference lines from all the distorted images stored in the storage medium 22 (Step ST24 "YES" shown in FIG. 7), then the distortion parameter evaluation unit 31 determines whether or not the calculations of the evaluation values of the distortion parameters are completed for all the reference lines (Step ST31 shown in FIG. 12).

If the calculations of the evaluation values of the distortion parameters of all the detected reference lines are not completed (Step ST31 "NO"), the distortion parameter calculation unit 13b firstly calculates each of the distortion parameters from the reference lines for each distorted image, and outputs the resultant to the distortion correction unit 14b (Step ST32). Then, the distortion correction unit 14b executes distortion correction of each distorted image with the use of the distortion parameters calculated from the distorted image (Step ST33). Subsequently, the distortion parameter evaluation unit 31 calculates the evaluation value of each of the distortion parameters by the aforementioned method (Step ST34).

If the calculations of the evaluation values of the distortion parameters of all the detected reference lines are completed (Step ST31 "YES"), the distortion parameter evaluation unit 31 outputs these evaluation values of the distortion parameters to the optimum distortion parameter calculation unit 32. The optimum distortion parameter calculation unit 32 calculates the optimum distortion parameter from all the distortion parameters on the basis of the evaluation values, and outputs the resultant to the distortion correction unit 14b (Step ST35). Receiving the optimum distortion parameter from the optimum distortion parameter calculation unit 32, the distortion correction unit 14b serially distortion-corrects the distorted images input from the image pickup unit 11b with the use of the optimum distortion parameter, and outputs the resultant as a distortion-corrected image to the display unit 15 (Step ST36), and the display unit 15 displays the image on the screen (Step ST37).

As described above, the vehicle periphery image correction apparatus 10b according to Embodiment 3 is configured to further include: the optimum distortion parameter evaluation unit 31 for executing distortion correction of each of the reference images with the use of the plurality of distortion parameters calculated by the distortion parameter calculation unit 13b, and for calculating the evaluation values indicative of adequacy of the distortion correction on the basis of the corresponding correction result; and the optimum distortion parameter calculation unit 32 for calculating the optimum distortion parameter from among the plurality of distortion parameters calculated by the distortion parameter calculation unit 13b based on the evaluation values calculated by the optimum distortion parameter evaluation unit 31, wherein the distortion correction unit 14b corrects the distortion of the periphery image with the use of the optimum distortion parameter calculated by the optimum distortion parameter calculation unit 32. For this reason, the optimum distortion parameter is determined in such a manner that the distortion correction is actually executed with the use of the numerous reference lines detected from the plurality of distorted images to evaluate the adequacy of the correction, and therefore accuracy of the distortion correction can be enhanced.

In addition, the vehicle periphery image correction apparatus 10b according to Embodiment 3 is configured to further include either or both of the topographical information acquiring unit 33 for acquiring the topographical information of the vehicle periphery and the peripheral object detection unit 34 for detecting the object existing in the vehicle periphery, wherein the image pickup unit 11b acquires the periphery image from the camera by utilizing the topographical information acquired by the topographical information acquiring unit 33 or the information related to the object detected by the peripheral object detection unit 34. For this reason, it is achieved that the distortion parameter evaluation unit 31 can acquire the proper reference image and evaluates the distortion parameters, and therefore a more optimum distortion parameter can be obtained.

Meanwhile, as mentioned above, with a combined configuration of Embodiment 2 and Embodiment 3 described above, the optimum distortion parameter may be provided as follows: the proceeding similar to that in the reference line averaging unit 23 is implemented to the set of the reference lines establishing the base for calculating the distortion parameter in which the evaluation value is a fixed value or more to thus calculate the averaged reference line, and the reference line averaging unit 23 calculates the distortion parameter from that reference line.

Embodiment 4

Figure 13:
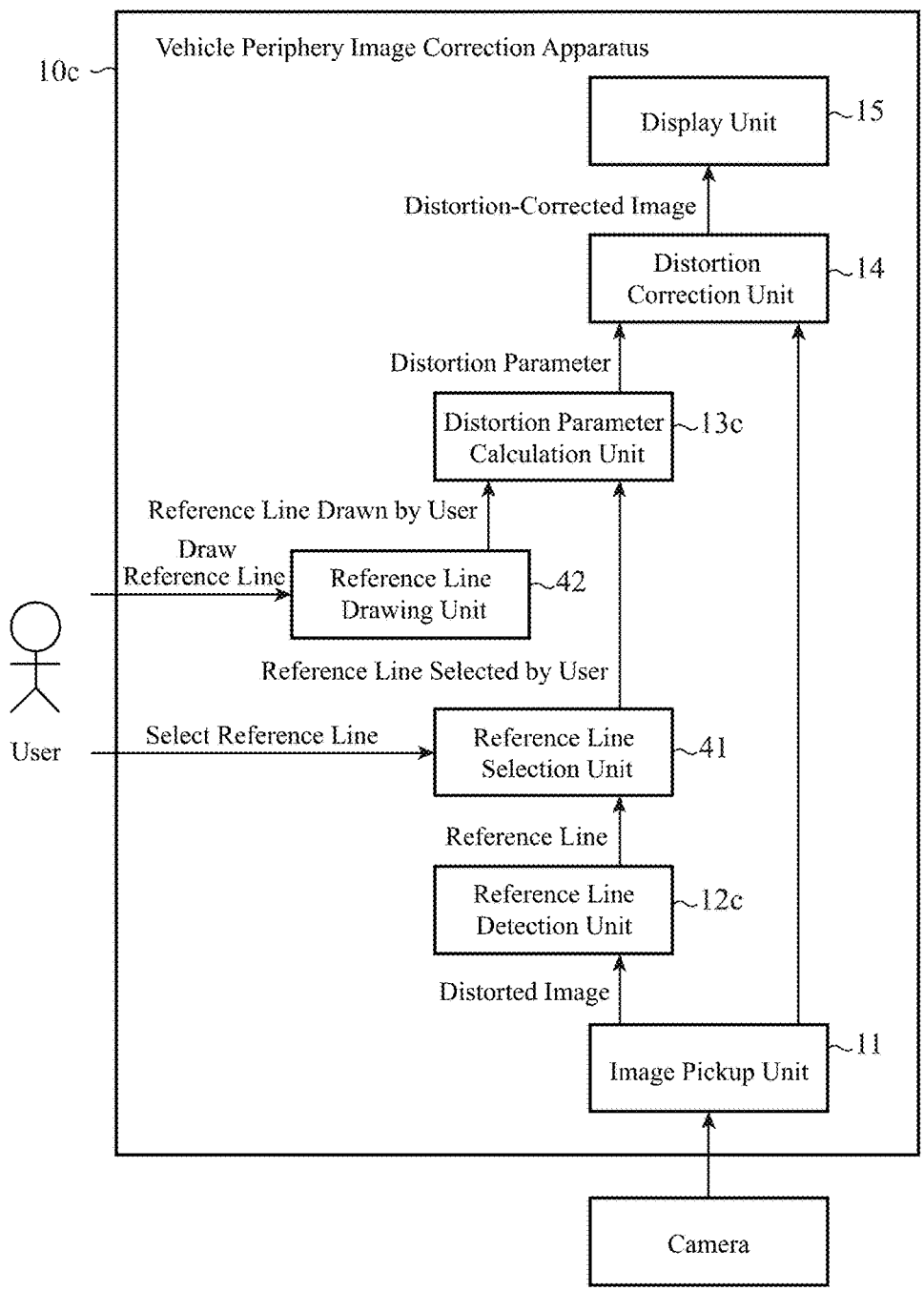
FIG. 13 is a block diagram showing a configuration of a vehicle periphery image correction apparatus according to Embodiment 4 of the invention.

FIG. 13 is a block diagram showing a configuration of a vehicle periphery image correction apparatus 10c according to Embodiment 4 of the invention. In FIG. 13, the same reference numerals are given for the same or equivalent parts as those in FIG. 1, and descriptions thereof will be omitted. The vehicle periphery image correction apparatus 10c is configured to further include a reference line selection unit 41 and a reference line drawing unit 42 as an input device to receive an input from a user.

A reference line detection unit 12c performs processing of reference line detection for distorted images acquired by an image pickup unit 11, and outputs all the detected reference lines to the reference line selection unit 41.

The reference line selection unit 41 is an input device such as a touch panel, a stick, and a cursor key, and causes the user to select a reference line to be used for distortion correction by presenting a plurality of reference lines detected by the reference line detection unit 12c to the user, and indicates the selected reference line to a distortion parameter calculation unit 13c.

Figure 14:
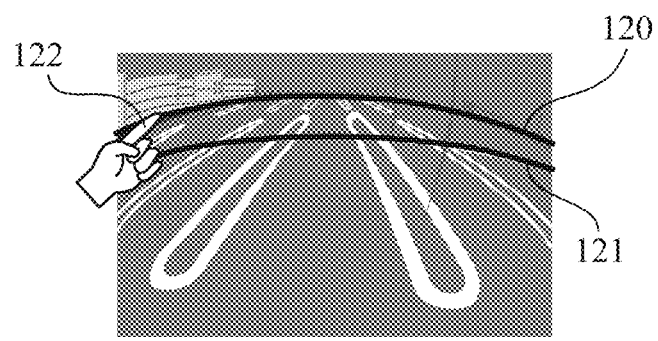
FIG. 14 is a diagram illustrating an example of a method of selecting a reference line with a touch panel by a reference line selection unit of Embodiment 4.

As a specific example of the selection method, for example, there are provided: when the plurality of reference lines are displayed with superposed on the distorted image, a method in which the reference line is directly selected therefrom with a touch panel; and a method in which the reference line is selected therefrom with a stick or a cursor key. In FIG. 14, a selection example of the reference line with the touch panel is shown. The reference line selection unit 41 gets the distorted image displayed, such that a plurality of reference lines 120 and 121 detected by the reference line detection unit 12c are superposed on the image that is screen-displayed by a display unit 15 constructed integrally with the touch panel. When the user selects the reference line 120 by touching this with a finger 122, the reference line selection unit 41 receives this selection operation to output the information related to the reference line 120 to the distortion parameter calculation unit 13c.

When causing the user to select the reference line, the reference line selection unit 41 may utilize a priority in which the reference line detection unit 12c gives to the reference line in detection of the reference line so that the user can easily select the reference line with a higher priority as shown in the following (1) to (3), for example:
(1) To indicate the priority for the reference line;
(2) To highlight the reference line with a higher priority; and
(3) To shift the cursor in descending order of the priority when the reference line is selected by the cursor key and so on.

In addition to this, for example, it may be configured as follows: the reference line averaging unit 23 in the above Embodiment 2 is provided for the vehicle periphery image correction apparatus 10c according to Embodiment 4, the plurality of reference lines detected by the reference line detection unit 12c are averaged, and a higher priority is set to the reference line that can be expected as a candidate for the average reference line. Also, for example, it may be configured as follows: the distortion parameter evaluation unit 31 and the optimum distortion parameter calculation unit 32 in the above Embodiment 3 are provided for the vehicle periphery image correction apparatus 10c according to Embodiment 4, and a higher priority is set to the reference line such that the evaluation value of the distortion parameter is placed in a higher rank among the plurality of reference lines detected by the reference line detection unit 12c. Furthermore, these configurations may be combined.

The reference line drawing unit 42 is an input device such as the touch panel, and causes the user to freely draw the reference line when the user is not satisfied with the candidate of the reference lines selectable at the reference line selection unit 41, or a proper reference line could not be detected, and then instructs the drawn reference line to the distortion parameter calculation unit 13c.

In a specific example, when an operation such that the user traces with a finger the horizon, a bumper of the host vehicle, and the like in the distorted image that is screen-displayed by the display unit 15 constructed integrally with the touch panel is carried out, the reference line drawing unit 42 receives that input operation and outputs the input as the information about the reference line to the distortion parameter calculation unit 13c.

The distortion parameter calculation unit 13c calculates a distortion parameter for a distortion correction equation for coordinate transformation such that a form of the reference line that is input from the reference line selection unit 41 or the reference line drawing unit 42 is made a straight form, and outputs the resultant to the distortion correction unit 14.

Figure 15:
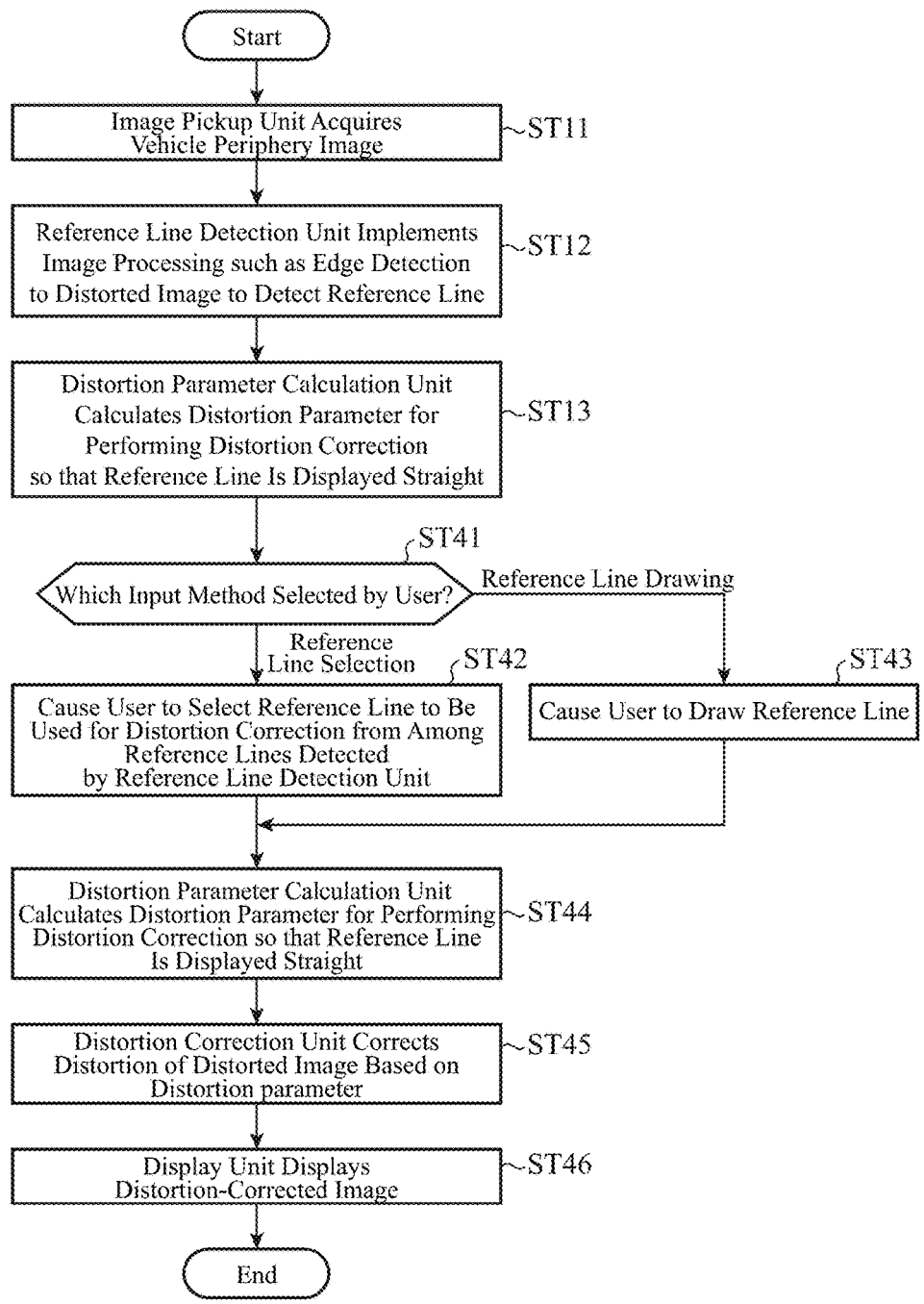
FIG. 15 is a flowchart showing an operation of the vehicle periphery image correction apparatus according to Embodiment 4.

Next, an operation of the vehicle periphery image correction apparatus 10c according to Embodiment 4 will be described by reference to a flowchart shown in FIG. 15. However, Step ST11 to Step ST13 shown in FIG. 15 are the same processes as Step ST11 to Step St13 shown in FIG. 4, and descriptions thereof will be omitted.

The vehicle periphery image correction apparatus 10c causes the user to select either of the reference line selection unit 41 and the reference line drawing unit 42 to be used (Step ST41). When the user selects the reference line selection unit 41 (Step ST41 "Reference Line Selection"), the reference line selection unit 41 causes the user to select a reference line to be used for distortion correction from among the reference lines detected by the reference line detection unit 12c, and outputs that reference line to the distortion parameter calculation unit 13c (Step ST42).

On the other hand, when the user selects the reference line drawing unit 42 (Step ST41 "Reference Line Drawing"), the reference line drawing unit 42 causes the user to draw the reference line, and outputs that reference line to the distortion parameter calculation unit 13c (Step ST43).

The distortion parameter calculation unit 13c calculates the distortion parameter from the reference line input from the reference line selection unit 41 or the reference line drawing unit 42, and outputs the resultant to the distortion correction unit (Step ST44). Receiving the distortion parameter from the distortion parameter calculation unit 13c, the distortion correction unit 14 serially corrects distortion of the distorted images that are input from the image pickup unit 11 with the use of that distortion parameter, and outputs the resultant as a distortion-corrected image to the display unit 15 (Step ST45), and the display unit 15 displays the image on the screen (Step ST46).

It is noted that the vehicle periphery image correction apparatus 10c may be configured to include both of the reference line selection unit 41 and the reference line drawing unit 42 and may be configured to include either of them. For example, in a case where only the reference line selection unit 41 is included, if the reference line detected by the reference line detection unit 12c is only one, the reference line selection unit 41 may be adapted to output the reference line as it is to the distortion parameter calculation unit 13c without presenting that reference line to the user.

As described above, the vehicle periphery image correction apparatus 10c according to Embodiment 4 is configured to further include the reference line selection unit 41 for causing the user to select a desired reference line from among the plurality of reference lines detected by the reference line detection unit 12c, and the distortion parameter calculation unit 13c calculates the distortion parameter with the use of the reference line received from the user by the reference line selection unit 41. For this reason, when the user is not satisfied with an automatic distortion correction by the vehicle periphery image correction apparatus 10c, it is possible to execute distortion correction based on the reference line selected by the user's self. According to this method, it is possible to reduce and simplify operations by the user in comparison with the conventional setting work in which the properties of a camera are measured to be set thereto.

Also, the vehicle periphery image correction apparatus 10c according to Embodiment 4 is configured to further include the reference line drawing unit 42 for receiving the reference line drawn by the user, such that the distortion parameter calculation unit 13c calculates the distortion parameter with the use of the reference line received from the user by the reference line drawing unit 42. For this reason, when the user cannot be satisfied with the reference line detected by the reference line detection unit 12c, it is possible for the user's self to freely draw and input the reference line. According to this method, it is possible to reduce and simplify operations by the user in comparison with the conventional setting work in which the properties of the camera are measured to be set thereto.

Embodiment 5

Figure 16:
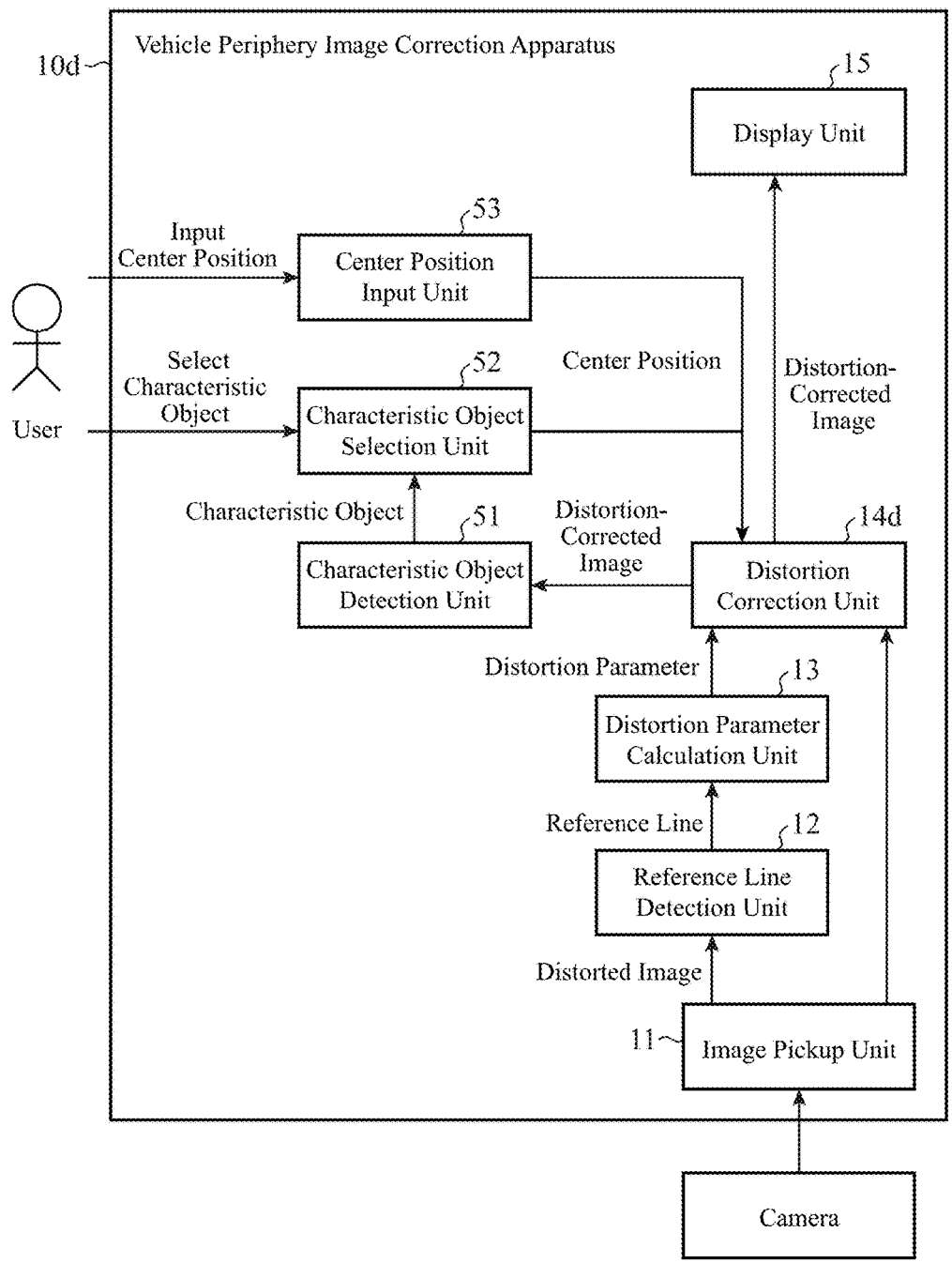
FIG. 16 is a block diagram showing a configuration of a vehicle periphery image correction apparatus according to Embodiment 5 of the invention.

FIG. 16 is a block diagram showing a configuration of a vehicle periphery image correction apparatus 10d according to Embodiment 5 of the invention. In FIG. 16, the same reference numerals are given for the same or equivalent parts as those in FIG. 1, and descriptions thereof will be omitted. Such a vehicle periphery image correction apparatus 10d is configured to further include a characteristic object detection unit 51, and also a characteristic object selection unit 52 and a center portion input unit 53 as an input device for receiving an input from the user.

In Embodiment 5, when the camera is installed at a position displaced from the center of the vehicle, a distortion-corrected image to be screen-displayed in a display unit 15 is subjected to centering with the use of an image taken by the camera. Hereinafter, a case where the camera is installed at a location displaced to right and left (in a horizontal direction) from the center of the vehicle will be described by way of example.

The characteristic object detection unit 51 detects an characteristic object (feature) that is more likely positioned at the center of the vehicle, for example, a license plate and a logo mark, from a distorted image that is input from a distortion correction unit 14*d*, and outputs the resultant to the characteristic object selection unit 52. For the method for detecting the characteristic object from the image, a publicly known method such as a pattern recognition may be used.

Also, the characteristic object detection unit 51 may be adapted to give a priority to the detected characteristic object and to preferentially output the characteristic object with a higher priority. For example, since the license plate and logo mark are relatively more likely positioned at the center of the host vehicle, a higher priority is set to them. Or it is not only to the license plate and so on, and a higher priority may be set to the characteristic object existing at the lower center of the image.

Meanwhile, when a wide-angle camera is mounted at the rear of the vehicle, right and left blinkers may appear on the right and left in the distorted image. In this case, the characteristic object detection unit 51 may calculate an approximate center position of the vehicle from the positions of the blinkers and to set a higher priority to the characteristic object existing around the calculated position.

The characteristic object selection unit 52 is an input device such as a touch panel and a cursor key, and causes the user to select the characteristic object existing at the center position of the vehicle from among the characteristic objects detected by the characteristic object detection unit 51, and outputs the position of the selected characteristic object as the center position to the distortion correction unit 14*d*.

Figure 17:
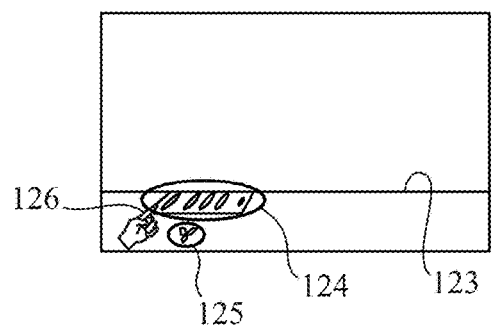
FIG. 17 is a diagram illustrating an example of a method of selecting a characteristic object with a touch panel by a characteristic object selection unit of Embodiment 5.

As a specific example of the selection method, similarly to the reference line selection unit 41 in the above Embodiment 4, there is provided a method: the plurality of characteristic objects detected by the characteristic object detection unit 51 are indicated clearly on the distorted image, and the characteristic object is selected with a touch panel, a cursor key, and so on. In FIG. 17, an example of the selection of the characteristic object with the touch panel is shown. The characteristic object selection unit 52 indicates clearly a license plate 124 and a logo mark 125 on a host-vehicle bumper 123 in the distortion-corrected image screen-displayed by the display unit 15 constructed integrally with the touch panel. In an example in FIG. 17, the characteristic object is surrounded by a red line to be indicated clearly. When the user selects the license plate 124 by touching this with a finger 126, the characteristic object detection unit 52 receives the operation of that selection to output the position of the license plate 124 as the center position to the distortion correction unit 14*d*.

Also, when the characteristic object detection unit 52 causes the user to select the characteristic object, similarly to the reference line selection unit 41 in the above Embodiment 4, and may utilize the priority in which the characteristic object detection unit 51 gives to the characteristic object in detection of the characteristic object reference line, so that the user can easily select the characteristic object with a higher priority.

The center position input unit 53 is an input device such as the touch panel, and causes the user to specify the center position, when the user is not satisfied with the candidate of the characteristic objects selectable at the characteristic object selection unit 52, or a proper characteristic object could not be detected, and indicates the specified position as the center position to the distortion correction unit 14*d*.

In a specific example, when the user makes an operation of touching the center position on the distortion-corrected image that is screen-displayed by the display unit 15 constructed integrally with the touch panel, the center position input unit 53 receives the input operation, and outputs the resultant to the distortion correction unit 14*b* as the information of the center position.

The distortion correction unit 14*d* distortion-corrects the distorted image that is input from the image pickup unit 11 with the use of the distortion parameter that is input from the distortion parameter calculation unit 13, and outputs the resultant to the display unit 15 and also outputs the distortion-corrected image to the characteristic object detection unit 51. In addition, the distortion correction unit 14*d* performs centering of the distortion-corrected image so that the center position input from the characteristic object selection unit 52 or the characteristic object selection unit 52 is positioned at the center of the image.

Figure 18:
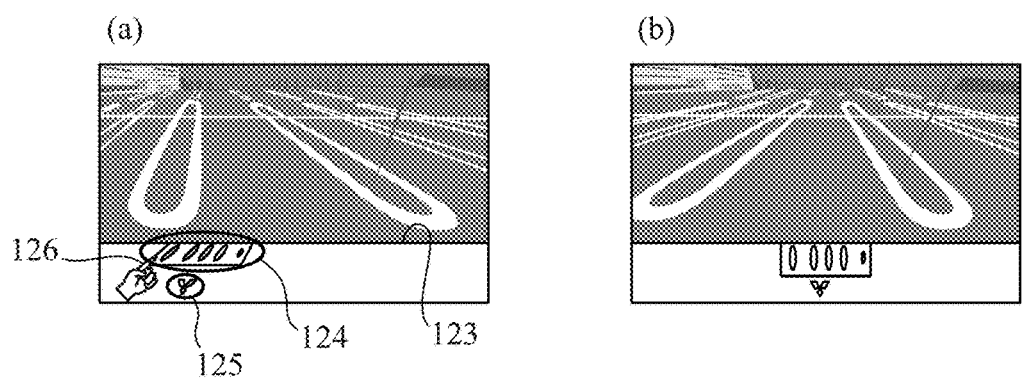
FIG. 18 is a diagram showing an example of centering of a distortion-corrected image by a distortion correction unit of Embodiment 5.

In FIG. 18, an example of the centering of the distortion-corrected image is shown. In a distortion-corrected image before the centering shown as FIG. 18(*a*), when the license plate 124 of the host-vehicle bumper 123 is touched with the finger 126 of the user and thus the corresponding position is specified at the center position, the distortion correction unit 14*d* performs centering so that the license plate 124 is positioned at the center of the image, to produce a distortion-corrected image that is subjected to the centering shown in FIG. 18(*b*). Additionally, the centering may be performed as follows: the right-side area of the image in FIG. 18(*a*) is reduced, while the left-side area thereof is enlarged; the whole image is shifted rightward when a pixel exists outside the frame of the image; or a method other than these may be adopted.

Figure 19:
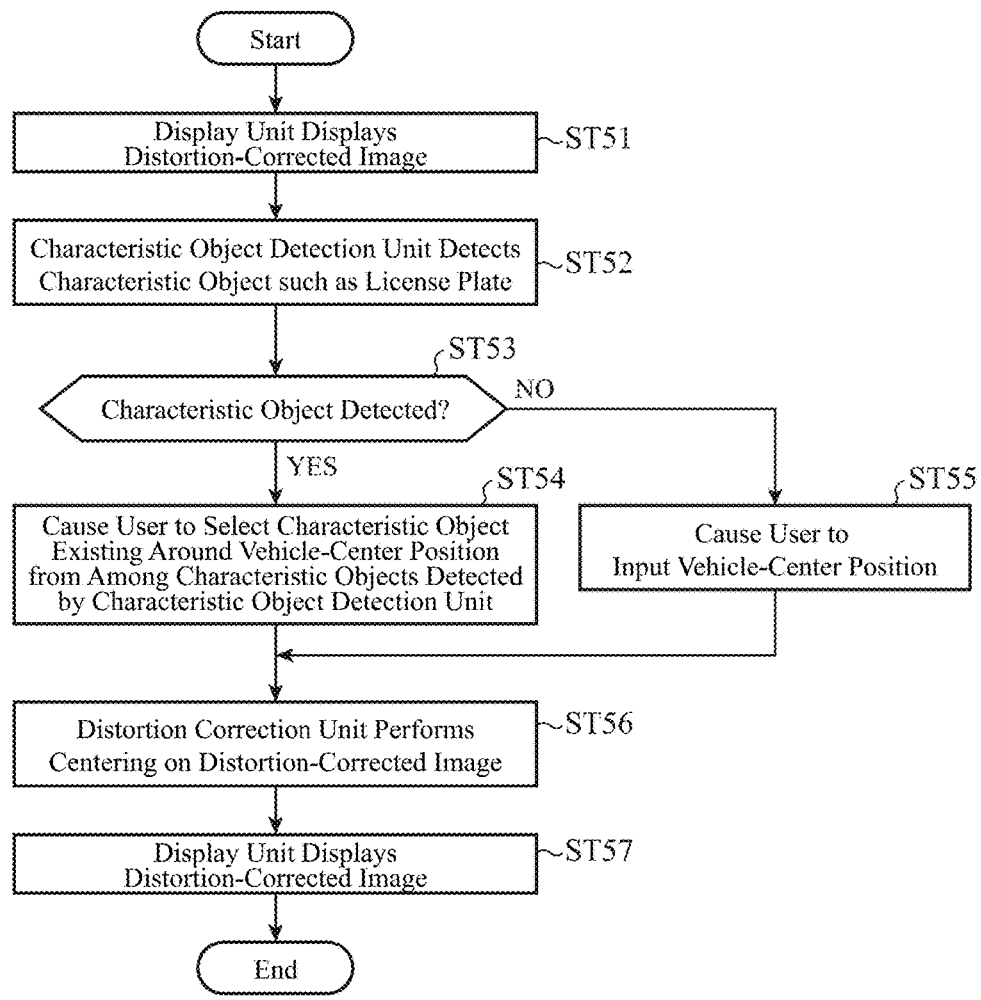
FIG. 19 is a flowchart showing an operation of the vehicle periphery image correction apparatus according to Embodiment 5.

Next, an operation of the vehicle periphery image correction apparatus 10*d* according to Embodiment 5 will be described by reference to a flowchart shown in FIG. 19.

The image pickup unit 11, the reference line detection unit 12, the distortion parameter calculation unit 13 and the distortion correction unit 14*d* perform the prescribed processes to distortion-correct the distorted image, and the display unit 15 displays the distortion-corrected image on the screen (Step ST51). However, the corresponding process may be stopped at the distortion-correction of the distorted image, and the on-screen display may be omitted. Subsequently, the characteristic object detection unit 51 detects a characteristic object such as the license plate from the distortion-corrected image (Step ST52).

The vehicle periphery image correction apparatus 10*d* causes the flow to proceed to Step ST54 when the characteristic object detection unit 51 detects the characteristic object (Step ST53 "YES"), and proceed to Step ST55 when the characteristic object is not detected (Step ST53 "NO"). Alternatively, the following may be taken: the apparatus causes the user to select either of the characteristic object selection unit 52 and the center position input unit 53 (Step ST53); the flow proceeds to Step ST54, when the user selects the characteristic object selection unit 52 (comparable to "YES" at Step ST53), and proceeds to Step ST55, when the center position input unit 53 is selected (comparable to "NO" at Step ST53).

The characteristic object selection unit 52 causes the user to select the characteristic object existing at the center position from among the characteristic objects detected by the characteristic object detection unit 51, and outputs the position of the characteristic object as the center position of the host vehicle to the distortion correction unit 14*d* (Step ST54).

In contrast, the center position input unit 53 causes the user to specify the center position of the host vehicle, and outputs the specified position as the center position to the distortion correction unit 14*d* (Step ST55).

The distortion correction unit 14d serially performs centering of subsequent distortion-corrected images so that the center position that is input from the characteristic object selection unit 52 or the center position input unit 53 is positioned at the center of the image, and outputs the image to the display unit 15 (Step ST56), and the display unit 15 displays the image on the screen (Step ST57).

However, after applying image processing to the distortion-corrected image, the distortion correction unit 14d may perform centering of the resultant; the distortion correction unit may concurrently perform distortion correction and centering of the distorted image by a method of performing the distortion correction with both of the distortion parameter and the center position as inputs; or the image processing is applied to the distorted image and subjected to the centering, and then the distortion correction may be performed.

Further, in the above description, although the distortion correction unit 14d performs the centering only in a left-to-right (lateral) direction, it may instead or additionally perform centering in an up-to-down direction (vertical direction).

Meanwhile, it may be configured such that the user can use the characteristic object selection unit 52 and the center position input unit 53 without concern for their difference in function. For example, it is configured such that the characteristic object selection unit 52 is designed to have only a function for displaying the characteristic objects on the distortion-corrected image; a position selected by the user with the touch panel and so on is determined as the center position, regardless of presence/absence of the characteristic object on the selected position. With this configuration, the characteristic object selection unit 52 and the center position input unit 53 are adapted to perform the same operation in appearance, so that the position specified by the user is used as the center position for the centering, regardless of presence/absence of the characteristic object.

Further, it may be configured such that when the characteristic object detection unit 51 extracts the characteristic object, the distortion correction unit 14d automatically performs the centering by using the position of the said characteristic object as the center position, without receiving an instruction from the user with the characteristic object selection unit 52 and the center position input unit 53. In a case of this configuration, the following is preferable: it is achieved that the characteristic object detection unit 51 can acquire outline information corresponding to the vehicle type of the host vehicle; the characteristic object detection unit 51 determines what kinds of characteristic objects exist at the center of the vehicle and extracts the characteristic object, and the distortion correction unit 14d performs the centering thereof. The outline information related to the vehicle type may be reserved in advance in any one of the components of the vehicle periphery image correction apparatus 10d, or acquired from another on-vehicle device; on the basis of the information of the vehicle type that is written into the vehicle periphery image correction apparatus 10d or acquired from another on-vehicle device, only the outline information may be acquired via a network.

As described above, the vehicle periphery image correction apparatus 10d according to Embodiment 5 is configured to further include the characteristic object detection unit 51 for detecting the given characteristic object from the periphery image, and the characteristic object selection unit 52 for causing the user to select the desired characteristic from among the plurality of characteristic objects detected by the characteristic object detection unit 51, wherein the distortion correction unit 14d performs centering of the periphery image so that the characteristic object received from the user by the characteristic object selection unit 52 is displayed at the center on the screen of the display unit 15, and also performs distortion correction thereof. For this reason, when the camera is installed at the position displaced from the center of the vehicle, it is possible for the user to easily achieve centering of the image without any setting work to measure and set the displacement from the center of the vehicle.

Further, the vehicle periphery image correction apparatus 10d according to Embodiment 5 is configured to further include the center position input unit 53 for receiving from the user the position of the periphery image to be displayed at the center of the screen of the display unit 15, wherein the distortion correction unit 14d performs centering of the periphery image so that the position received from the user by the center position input unit 53 is displayed at the center of the screen of the display unit 15, and also performs distortion correction thereof. For this reason, when the user is not satisfied with the characteristic objects detected by the characteristic object detection unit 51, or the characteristic object detection unit 51 cannot detect the characteristic object, the user's self specifies the center position to thereby perform centering thereof easily.

Incidentally, in the above Embodiments 1 to 5, the vehicle periphery image correction apparatuses 10, 10a to 10d that are directed to an automobile are described as the examples, it is not limited to the automobile, and is applicable to an moving object such as a ship, an airplane, a train, and the like.

Also, the camera may be an attachable/detachable type one other than a fixed type one to the vehicle for use. In that case, for each time the camera is attached thereto, the detection of the reference line and the calculation of the distortion parameter shall be done. Further, it is configured that a device for detecting an attaching angle (attitude) of the camera (acceleration sensor, angle sensor, and so on) may be provided thereon, and that the detection of the reference line and the like are implemented with the angle of the periphery image corrected in accordance with the attitude of the camera, to thereby enhance further the accuracy of the distortion correction.

Also, according to the present invention, within the scope of the invention, the embodiments can be freely combined, or any components in the embodiments can be modified or any components in the embodiments can be omitted.

INDUSTRIAL APPLICABILITY

As described above, the moving object periphery image correction apparatus according to the invention is configured to automatically correct the distortion of the periphery image produced due to camera, and therefore it is suitable for use in a car-navigation apparatus or the like that displays the image by the fisheye camera mounted on the vehicle to a user.

DESCRIPTION OF REFERENCE NUMERALS AND SIGNS 10, 10a, 10a-1, 10b-10d: vehicle periphery image correction apparatus, 11, 11b: image pickup unit, 12, 12a, 12b, 12c: reference line detection unit, 13, 13a, 13b, 13c: distortion parameter calculation unit, 14, 14b, 14d: distortion correction unit, 15: display unit, 21: image storing unit, 22: storage medium, 23: reference line averaging unit, 24: distortion parameter averaging unit (optimum distortion parameter calculation unit), 31: distortion parameter evaluation unit, 32: optimum distortion parameter calculation unit, 33: topographical information acquiring unit, 34: peripheral object detection unit, 41: reference line selection unit, 42: reference line drawing unit, 51: characteristic object detection unit, 52: characteristic object selection unit, 53: center position input unit.

The invention claimed is:

1. A moving object periphery image correction apparatus comprising:
   an interface to an imaging device from which a plurality of periphery images of a moving object are acquired from said imaging device;
   a processor; and
   a memory coupled to the processor, said memory storing instructions which, when executed by the processor, result in performance of a process including,
      extracting an edge from each of the acquired periphery images, and determining a curved reference line from each extracted edge;
      calculating a priority for each of the acquired periphery images;
      selecting at least one of the acquired periphery images with the highest priority as a reference image;
      calculating a distortion parameter for distortion correction of the reference image such that the determined reference line is made linear;
      correcting a distortion of one or more acquired periphery images acquired with the use of the calculated distortion parameter, and outputting each corrected periphery image as a periphery image to be displayed; and
      acquiring topographical information of the periphery of the moving object,
   wherein the acquired topographical information is used by the processor to determine whether the periphery of the moving object is at an expressway, and to give a higher priority to each of the periphery images acquired from the imaging device when the periphery of the moving object is determined to be at an expressway thereby increasing the likelihood of selecting an acquired peripheral image with a limited number of potential edges as the reference image.

2. The moving object periphery image correction apparatus of claim 1, wherein the process further comprises calculating an optimum distortion parameter by using a plurality of distortion parameters calculated for each of a plurality of reference lines when a plurality of reference lines are determined from respective edges extracted from the periphery image,
   wherein the distortion of the periphery image is corrected by using the calculated optimum distortion parameter.

3. The moving object periphery image correction apparatus of claim 2, wherein an average of the plurality of distortion parameters is calculated to determine the optimum distortion parameter.

4. The moving object periphery image correction apparatus of claim 2, wherein the process further comprises distortion-correcting each of reference images by using the plurality of distortion parameters calculated for each of the plurality of reference lines when the plurality of reference lines are detected, and calculating an evaluation value indicative of adequacy of the distortion correction on the basis of a result of the said correction,
   wherein an optimum distortion parameter is calculated from among the plurality of distortion parameters based on the calculated evaluation value.

5. The moving object periphery image correction apparatus of claim 1, wherein the process determines a plurality of reference lines from respective edges extracted from the periphery image, the process further comprising causing a user to select a desired reference line from among the plurality of reference lines,
   wherein the distortion parameter is calculated by using the reference line selected by the user.

6. The moving object periphery image correction apparatus of claim 1, wherein the process further comprises receiving a reference line drawn by a user,
   wherein the distortion parameter is calculated by using the reference line drawn by the user.

7. The moving object periphery image correction apparatus of claim 1, wherein the process further comprises detecting a given characteristic object from the periphery image, and causing a user to select a desired characteristic object from among a plurality of characteristic objects,
   wherein centering and distortion correction of the periphery image is performed such that the characteristic object selected by the user is displayed at the center of a screen of a display.

8. The moving object periphery image correction apparatus of claim 1, wherein the process further comprises receiving input from a user of a position of the periphery image to be displayed at the center of a screen of a display,
   wherein centering and distortion correction of the periphery image is performed such that the position inputted from the user is positioned at the center of the screen of the display.

9. The moving object periphery image correction apparatus of claim 1, wherein the determined curved reference line extends horizontally.

10. The moving object periphery image correction apparatus of claim 1, wherein the imaging device is attachable and detachable to and from the moving object.

11. The moving object periphery image correction apparatus of claim 1, wherein the imaging device is a wide-angle imaging device.

12. The moving object periphery image correction apparatus of claim 1, wherein the moving object is a vehicle.

13. A moving object periphery image correction apparatus comprising:
   an interface to an imaging device from which a plurality of periphery images of a moving object are acquired from said imaging device;
   a processor; and
   a memory coupled to the processor, said memory storing instructions which, when executed by the processor, result in performance of a process including,
      extracting an edge from each of the acquired periphery images, and determining a curved reference line from each extracted edge;
      calculating a priority for each of the acquired periphery images;
      selecting at least one of the acquired periphery images with the highest priority as a reference image;
      calculating a distortion parameter for distortion correction of the reference image such that the determined reference line is made linear;
      correcting a distortion of one or more acquired periphery images acquired with the use of the calculated distortion parameter, and outputting each corrected periphery image as a periphery image to be displayed; and acquiring topographical information of the periphery of the moving object, wherein the acquired topographical information is used by the processor to determine whether the periphery of the moving object is at an expressway, and to give a higher priority to each of the periphery images acquired from the imaging device when the periphery of the moving object is determined to be at an expressway thereby increasing the likelihood of selecting an acquired peripheral image with a limited number of potential edges as the reference image, and wherein the distortion is corrected for the one or more acquired periphery images using the following equations:

$$Xu = Xd + k \times (Xd^2 + Yd^2) \text{ and}$$

$$Yu = Yd + k \times (Xd^2 + Yd^2),$$

where (Xu, Yu) is a coordinate after a distortion correction, (Xd, Yd) is a coordinate before the distortion correction, and k is the distortion parameter.

\* \* \* \* \*